US012636937B2

(12) United States Patent
Hu et al.

(10) Patent No.: US 12,636,937 B2
(45) Date of Patent: May 26, 2026

(54) VEHICLE TEMPERATURE MANAGEMENT SYSTEM

(71) Applicant: Shenzhen Yinwang Intelligent Technologies Co., Ltd., Shenzhen (CN)

(72) Inventors: Haomang Hu, Shanghai (CN); Zhiwei Wu, Shanghai (CN); Xiaokang Liu, Shanghai (CN); Jing Jiang, Shanghai (CN); Zuqi Liu, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 632 days.

(21) Appl. No.: 17/216,196

(22) Filed: Mar. 29, 2021

(65) Prior Publication Data

US 2021/0215414 A1     Jul. 15, 2021

Related U.S. Application Data

(63) Continuation of application No. PCT/CN2019/109542, filed on Sep. 30, 2019.

(30) Foreign Application Priority Data

Sep. 30, 2018    (CN) .......................... 201811154407.4

(51) Int. Cl.
*B60H 1/00* (2006.01)
*F25B 13/00* (2006.01)
*F25B 49/02* (2006.01)

(52) U.S. Cl.
CPC ......... *B60H 1/00485* (2013.01); *F25B 13/00* (2013.01); *F25B 49/02* (2013.01);
(Continued)

(58) Field of Classification Search
CPC ...... B60H 1/00485; B60H 2001/00171; B60H 2001/003; B60H 1/00342; B60H 1/00328; B60H 1/00907; B60H 2001/00935; B60H 2001/3264; B60H 2001/3257; B60H 2001/00957; F25B 13/00; F25B 49/02; F25B 2313/02741
See application file for complete search history.

(56) References Cited

U.S. PATENT DOCUMENTS

2002/0046570 A1     4/2002   Itoh et al.
2005/0204766 A1     9/2005   Sasaki
(Continued)

FOREIGN PATENT DOCUMENTS

CN           1673647  A     9/2005
CN        102059932  A     5/2011
(Continued)

*Primary Examiner* — Tavia Sullens
(74) *Attorney, Agent, or Firm* — Conley Rose, P.C.

(57) ABSTRACT

A vehicle temperature management system includes a refrigerant circulation system including a compressor, a first heat exchanger, a depressurization apparatus, a heat exchange plate, a four-way valve, and a second heat exchanger that is configured to heat a first refrigerant that flows to an input port when a management object needs to be cooled through the heat exchange plate, and cool the first refrigerant that flows to the heat exchange plate when the management object needs to be heated through the heat exchange plate.

6 Claims, 12 Drawing Sheets

(52) U.S. Cl.
    CPC ............... *B60H 2001/00171* (2013.01); *F25B 2313/02741* (2013.01)

(56)                     References Cited

U.S. PATENT DOCUMENTS

| | | | |
|---|---|---|---|
| 2011/0113800 A1 | 5/2011 | Sekiya et al. | |
| 2012/0117993 A1 | 5/2012 | Takahashi | |
| 2012/0125032 A1 | 5/2012 | Graaf et al. | |
| 2014/0109613 A1* | 4/2014 | Ohno ..................... | F25B 13/00 |
| | | | 62/498 |
| 2014/0147709 A1 | 5/2014 | Ketkar et al. | |
| 2015/0267930 A1 | 9/2015 | Ryu et al. | |
| 2016/0265819 A1 | 9/2016 | Durrani et al. | |
| 2018/0201098 A1 | 7/2018 | Katoh et al. | |

FOREIGN PATENT DOCUMENTS

| | | |
|---|---|---|
| CN | 203190724 U | 9/2013 |
| CN | 105144465 A | 12/2015 |
| CN | 205836438 U | 12/2016 |
| CN | 206040912 U | 3/2017 |
| CN | 108106041 A | 6/2018 |
| CN | 108266877 A | 7/2018 |
| DE | 112016003180 T5 | 3/2018 |
| JP | 2002195677 A | 7/2002 |
| JP | 2005265381 A | 9/2005 |
| JP | 2008122034 A | 5/2008 |
| WO | 2011132429 A1 | 10/2011 |

* cited by examiner

VEHICLE TEMPERATURE MANAGEMENT SYSTEM

CROSS-REFERENCE TO RELATED APPLICATIONS

This application is a continuation of International Patent Application No. PCT/CN2019/109542 filed on Sep. 30, 2019, which claims priority to Chinese Patent Application No. 201811154407.4 filed on Sep. 30, 2018. The disclosures of the aforementioned applications are hereby incorporated by reference in their entireties.

TECHNICAL FIELD

This application relates to the field of temperature management, and in particular, to a vehicle temperature management system and a vehicle temperature management method. The vehicle temperature management system and the vehicle temperature management method may be applied to vehicles such as various automobiles, intelligent automobiles, and autonomous automobiles.

BACKGROUND

In a vehicle temperature management technology known currently, a refrigerant circulation system includes a compressor, a condenser, an expansion valve, a heat exchange plate, and a four-way valve, a refrigerant can exchange heat with a control object through the heat exchange plate, and connectivity of each port is controlled using the four-way valve, so that the control object can be cooled or heated.

In the refrigerant circulation system, in a heating mode, a high-temperature and high-pressure refrigerant output from the compressor is directly input to an input port of the heat exchange plate, and in a cooling mode, an output port of the heat exchange plate is directly connected to an input port of the compressor. Consequently, in both the heating mode and the cooling mode, there is a problem that a temperature difference between the input port and the output port of a cooling plate is relatively large, that is, a temperature of the heat exchange plate is uneven.

SUMMARY

This application provides a vehicle temperature management system, to improve evenness of temperature distribution of a heat exchange plate.

According to a first aspect, a vehicle temperature management system is provided, including a compressor 110, including an input port 112 and an output port 116, where the compressor 110 is configured to compress a first refrigerant input from the input port 112, and output the compressed first refrigerant from the output port 116, a first temperature sensor 120, configured to detect a first temperature of the first refrigerant input from the input port 112 to the compressor 110, a first heat exchanger 130, including a first interface 132 and a second interface 136 for ingress and egress of the first refrigerant, where the first heat exchanger 130 is configured to cool the first refrigerant input to the first heat exchanger 130, a depressurization apparatus 140, including a third interface 142 and a fourth interface 146 for ingress and egress of the first refrigerant, where the third interface 142 is connected to the second interface 136, and the depressurization apparatus 140 is communicatively connected to the first temperature sensor 120, to depressurize the input first refrigerant based on the first temperature, so that the first temperature falls within a first temperature range, a heat exchange plate 150, including a fifth interface 152 and a sixth interface 156 for ingress and egress of the first refrigerant, where the fifth interface 152 is connected to the fourth interface 146, and the heat exchange plate 150 is configured to enable the input first refrigerant to exchange heat with a management object of the temperature management system, a four-way valve 160, including a first port 162, a second port 164, a third port 166, and a fourth port 168, where the first port 162 is connected to the sixth interface 156, the second port 164 is connected to the output port 116, the third port 166 is connected to the first interface 132, the fourth port 168 is connected to the input port 112, the four-way valve 160 is configured to, when the management object needs to be cooled through the heat exchange plate 150, control the first port 162 to be connected to the fourth port 168 and control the second port 164 to be connected to the third port 166, and the four-way valve 160 is configured to, when the management object needs to be heated through the heat exchange plate 150, control the first port 162 to be connected to the second port 164 and control the fourth port 168 to be connected to the third port 166, and a second heat exchanger 180, configured to, when the management object needs to be cooled through the heat exchange plate 150, heat the first refrigerant that flows from the sixth interface 156 to the input port 112, and when the management object needs to be heated through the heat exchange plate 150, cool the first refrigerant that flows from the output port 116 to the sixth interface 156.

To be specific, the vehicle temperature management system includes a refrigerant circulation system and a control system. The refrigerant circulation system includes the four-way valve, the compressor, the first heat exchanger, an expansion valve of the depressurization apparatus, and the heat exchange plate. The control system includes the first temperature sensor and a controller of the depressurization apparatus. The first temperature sensor is configured to detect the first temperature of the refrigerant input to the compressor. The controller is configured to control the expansion valve based on the first temperature, so that the first temperature falls within the first temperature range. The refrigerant circulation system further includes the second heat exchanger, configured to, when the management object needs to be cooled through the heat exchange plate, heat the first refrigerant that flows to the compressor (further, the first refrigerant that flows from the heat exchange plate or the four-way valve to the compressor), and when the management object needs to be heated through the heat exchange plate, cool the first refrigerant that flows to the heat exchange plate (further, the first refrigerant that flows from the compressor or the four-way valve to the heat exchange plate).

According to the vehicle temperature management system provided in this application, when the management object needs to be cooled through the heat exchange plate 150, the refrigerant that flows from the heat exchange plate 150 to the compressor 110 through the four-way valve 160 can be heated through the second heat exchanger 180. To be specific, if a temperature of the refrigerant that flows out of the heat exchange plate 150 is set to t1, and a temperature of the refrigerant (namely, the refrigerant input to the compressor 110) heated by the second heat exchanger 180 is set to t2, it may be determined that t2>t1. t2 is detected using the first temperature sensor 120, and the depressurization apparatus 140 is controlled based on t2, so that t2 falls within a temperature range. This can ensure that t1 is lower than a refrigerant temperature at an inlet of the compressor 110, and further reduce a temperature difference between the input port and the output port of a cooling plate. When the management object needs to be heated through the heat exchange plate 150, the refrigerant that flows from an outlet of the compressor 110 to the heat exchange plate 150 through the four-way valve 160 can be cooled through the second heat exchanger 180. To be specific, if a temperature of the refrigerant that flows out of the compressor 110 is set to t3, and a temperature of the refrigerant (namely, the refrigerant input to the heat exchange plate 150) cooled by the second heat exchanger 180 is set to t4, it may be determined that t3>t4. This further avoids an excessively high refrigerant temperature at an inlet of the heat exchange plate 150, and can further reduce the temperature difference between the input port and the output port of the cooling plate. Therefore, according to the vehicle temperature management system in this application, evenness of temperature distribution of the heat exchange plate can be improved.

In this application, the refrigerant may also be referred to as a coolant, and can change between a liquid state and a gas state.

In this application, "the first port 162 is connected to the sixth interface 156" may be understood as that the first port 162 is connected to the sixth interface 156 through the second heat exchanger 180.

For example, that the first port 162 is connected to the sixth interface 156 may mean that the first port 162 is connected to one interface of the second heat exchanger 180, and the sixth interface 156 is connected to the other interface of the second heat exchanger 180.

The vehicle temperature management system may switch between a cooling mode and a heating mode. In the cooling mode, the management object may be cooled, and in the heating mode, the management object may be heated.

In this case, "the four-way valve 160 is configured to, when the management object needs to be cooled through the heat exchange plate 150, control the first port 162 to be connected to the fourth port 168 and control the second port 164 to be connected to the third port 166" may be understood as, when receiving an instruction of switching to the cooling mode, the four-way valve 160 controls the first port 162 to be connected to the fourth port 168 and controls the second port 164 to be connected to the third port 166.

Similarly, "the four-way valve 160 is configured to, when the management object needs to be heated through the heat exchange plate 150, control the first port 162 to be connected to the second port 164 and control the fourth port 168 to be connected to the third port 166" may be understood as, when receiving an instruction of switching to the heating mode, the four-way valve 160 controls the first port 162 to be connected to the second port 164 and controls the fourth port 168 to be connected to the third port 166.

Optionally, the second heat exchanger 180 is configured to exchange heat between the first refrigerant that flows between the third port 166 and the first interface 132 and the first refrigerant that flows between the first port 162 and the sixth interface 156.

Therefore, a function of the second heat exchanger 180 can be implemented using a temperature difference between the first refrigerant that flows between the third port 166 and the first interface 132 and the first refrigerant that flows between the first port 162 and the sixth interface 156. In this way, an external energy source does not need to be additionally disposed, namely, an energy source used to implement heating or cooling. This can achieve an effect of this application with low energy consumption, and further improve practicability of this application.

Optionally, the first port 162 is connected to the sixth interface 156 through a first pipe 172, and the third port 166 is connected to the first interface 132 through a second pipe 174. The second heat exchanger 180 includes a first portion 1721 of the first pipe 172 and a second portion 1741 of the second pipe 174. The first portion 1721 and the second portion 1741 are configured in parallel, and a distance between the first portion 1721 and the second portion 1741 is less than or equal to a first threshold.

Optionally, a thermal conductivity of a material of the first portion 1721 is higher than a thermal conductivity of a portion of the first pipe 172 other than the first portion 1721.

Optionally, a thermal conductivity of a material of the second portion 1741 is higher than a thermal conductivity of a portion of the second pipe 174 other than the second portion 1741.

Therefore, heat transfer efficiency of a portion that is of the pipe and that is in the second heat exchanger 180 can be improved, and heat transfer between a portion that is of the pipe and that is outside the second heat exchanger 180 and external air can be reduced.

Optionally, the fourth port 168 is connected to the input port 112 through a third pipe 176, and the second port 164 is connected to the output port 116 through a fourth pipe 178. The second heat exchanger 180 includes a third portion 1761 of the third pipe 176 and a fourth portion 1781 of the fourth pipe 178. The third portion 1761 and the fourth portion 1781 are configured in parallel, and a distance between the third portion 1761 and the fourth portion 1781 is less than or equal to a first threshold.

Optionally, a thermal conductivity of a material of the third portion 1761 is higher than a thermal conductivity of a portion of the third pipe 176 other than the third portion 1761.

Optionally, a thermal conductivity of a material of the fourth portion 1781 is higher than a thermal conductivity of a portion of the fourth pipe 178 other than the fourth portion 1781.

Therefore, heat transfer efficiency of a portion that is of the pipe and that is in the second heat exchanger 180 can be improved, and heat transfer between a portion that is of the pipe and that is outside the second heat exchanger 180 and external air can be reduced.

Optionally, the second heat exchanger 180 is configured to enable the first refrigerant at the third port 166 to exchange heat with a second refrigerant at the first interface 132.

The function of the second heat exchanger 180 is implemented using an external refrigerant, so that a change in a line of a pipe of a refrigeration cycle can be reduced.

Optionally, the second refrigerant includes the external air.

In this case, the second heat exchanger 180 includes a fan 182, configured to control a flow rate of the external air.

Optionally, the vehicle temperature management system further includes a second temperature sensor 122, configured to detect a second temperature of the first refrigerant that flows in or out of the heat exchange plate 150 through the fifth interface 152, a third temperature sensor 124, configured to detect a third temperature of the first refrigerant that flows in or out of the heat exchange plate 150 through the sixth interface 156, and a fourth temperature sensor 126, configured to detect a fourth temperature of the first refrigerant output from the output port 116. The second heat exchanger 180 includes the fan 182, configured to control the flow rate of the external air, and the controller 184, communicatively connected to the first temperature sensor 120, the second temperature sensor 122, the third temperature sensor 124, and the fourth temperature sensor 126, to control a rotation speed of the fan 182 based on at least one of the first temperature, the second temperature, the third temperature, and the fourth temperature.

Optionally, when the management object needs to be cooled through the heat exchange plate 150, the controller 184 is configured to, if a difference between the first temperature and the second temperature is greater than a second threshold, increase the rotation speed of the fan 182 until the difference between the first temperature and the second temperature falls within a second temperature range.

A highest temperature in the second temperature range is the second threshold.

For example, the second threshold may be 6 degrees Celsius (° C.) or 7° C.

Optionally, when the management object needs to be cooled through the heat exchange plate 150, the controller 184 is configured to, if a difference between the first temperature and the second temperature is less than a third threshold, decrease the rotation speed of the fan 182 until the difference between the first temperature and the second temperature falls within a second temperature range.

A lowest temperature in the second temperature range is the third threshold.

For example, the third threshold may be 3° C. or 4° C.

Optionally, the second temperature range is determined based on a superheat degree corresponding to the depressurization apparatus 140.

To be specific, Ta=ΔT+C.

$$Tb=\Delta T-C.$$

Ta represents the second threshold. Tb represents the third threshold, and ΔT represents the superheat degree corresponding to the depressurization apparatus 140. For example, a value of ΔT may be 5° C. C may be a preset system threshold. For example, a value of C may be 1° C. or 2° C., or a value of C may be any temperature value between 1° C. and 2° C.

Optionally, when the management object needs to be heated through the heat exchange plate 150, the controller 184 is configured to, if a difference between the fourth temperature and the third temperature is greater than a fourth threshold, increase the rotation speed of the fan 182 until the difference between the fourth temperature and the third temperature falls within a third temperature range.

A highest temperature in the third temperature range is the fourth threshold.

For example, the fourth threshold may be 2° C.

Optionally, when the management object needs to be heated through the heat exchange plate 150, the controller 184 is configured to, if a difference between the fourth temperature and the third temperature is less than a fifth threshold, decrease the rotation speed of the fan 182 until the difference between the fourth temperature and the third temperature falls within a third temperature range.

A lowest temperature in the third temperature range is the fifth threshold.

For example, the fifth threshold may be 1° C.

Optionally, the management object is a vehicle battery.

According to a second aspect, a vehicle temperature management method is provided. The vehicle temperature management method is applied to a vehicle temperature management system, and the vehicle temperature management system includes a compressor 110, including an input port 112 and an output port 116, where the compressor 110 is configured to compress a first refrigerant input from the input port 112 and output the compressed first refrigerant from the output port 116, a first temperature sensor 120, configured to detect a first temperature of the first refrigerant input from the input port 112 to the compressor 110, a first heat exchanger 130, including a first interface 132 and a second interface 136 for ingress and egress of the first refrigerant, where the first heat exchanger 130 is configured to cool the input first refrigerant, a depressurization apparatus 140, including a third interface 142 and a fourth interface 146 for ingress and egress of the first refrigerant, where the third interface 142 is connected to the second interface 136, and the depressurization apparatus 140 is communicatively connected to the first temperature sensor 120, to depressurize the input first refrigerant based on the first temperature, so that the first temperature falls within a first temperature range, a heat exchange plate 150, including a fifth interface 152 and a sixth interface 156 for ingress and egress of the first refrigerant, where the fifth interface 152 is connected to the fourth interface 146, and the heat exchange plate 150 is configured to enable the input first refrigerant to exchange heat with a management object of the temperature management system, a four-way valve 160, including a first port 162, a second port 164, a third port 166, and a fourth port 168, where the first port 162 is connected to the sixth interface 156, the second port 164 is connected to the output port 116, the third port 166 is connected to the first interface 132, the fourth port 168 is connected to the input port 112, the four-way valve 160 is configured to, when the management object needs to be cooled through the heat exchange plate 150, control the first port 162 to be connected to the fourth port 168 and control the second port 164 to be connected to the third port 166, and the four-way valve 160 is configured to, when the management object needs to be heated through the heat exchange plate 150, control the first port 162 to be connected to the second port 164 and control the fourth port 168 to be connected to the third port 166, a second heat exchanger 180, configured to, when the management object needs to be cooled through the heat exchange plate 150, heat, using external air, the first refrigerant that flows from the sixth interface 156 to the input port 112, and when the management object needs to be heated through the heat exchange plate 150, cool, using external air, the first refrigerant that flows from the output port 116 to the sixth interface 156, a fan 182, configured to control a flow rate of the external air, a second temperature sensor 122, configured to detect a second temperature of the first refrigerant that flows in or out of the heat exchange plate 150 through the fifth interface 152, a third temperature sensor 124, configured to detect a third temperature of the first refrigerant that flows in or out of the heat exchange plate 150 through the sixth interface 156, a fourth temperature sensor 126, configured to detect a fourth temperature of the first refrigerant output from the output port 116, and a controller 184, communicatively connected to the first temperature sensor 120, the second temperature sensor 122, the third temperature sensor 124, and the fourth temperature sensor 126, to control a rotation speed of the fan 182 based on at least one of the first temperature, the second temperature, the third temperature, and the fourth temperature. The method is performed by the controller 184. The method includes the following. When the management object needs to be cooled through the heat exchange plate 150, the controller 184 is configured to, if a difference between the first temperature and the second temperature is greater than a second threshold, increase the rotation speed of the fan 182 until the difference between the first temperature and the second temperature falls within a second temperature range. Alternatively, when the management object needs to be cooled through the heat exchange plate 150, the controller 184 is configured to, if a difference between the first temperature and the second temperature is less than a third threshold, decrease the rotation speed of the fan 182 until the difference between the first temperature and the second temperature falls within a second temperature range. Alternatively, when the management object needs to be heated through the heat exchange plate 150, the controller 184 is configured to, if a difference between the fourth temperature and the third temperature is greater than a fourth threshold, increase the rotation speed of the fan 182 until the difference between the fourth temperature and the third temperature falls within a third temperature range. Alternatively, when the management object needs to be heated through the heat exchange plate 150, the controller 184 is configured to, if a difference between the fourth temperature and the third temperature is less than a fifth threshold, decrease the rotation speed of the fan 182 until the difference between the fourth temperature and the third temperature falls within a third temperature range.

A highest temperature in the second temperature range is the second threshold.

For example, the second threshold may be 6° C. or 7° C.

A lowest temperature in the second temperature range is the third threshold.

For example, the third threshold may be 3° C. or 4° C.

Optionally, the second temperature range is determined based on a superheat degree corresponding to the depressurization apparatus 140.

To be specific, Ta=ΔT+C.

$$Tb=\Delta T-C.$$

Ta represents the second threshold. Tb represents the third threshold, and ΔT represents the superheat degree corresponding to the depressurization apparatus 140. For example, a value of ΔT may be 5° C. C may be a preset system threshold. For example, a value of C may be 1° C. or 2° C., or a value of C may be any temperature value between 1° C. and 2° C.

A highest temperature in the third temperature range is the fourth threshold.

For example, the fourth threshold may be 2° C.

A lowest temperature in the third temperature range is the fifth threshold.

For example, the fifth threshold may be 1° C.

Optionally, the management object is a vehicle battery.

According to a third aspect, a cooling system is provided, including a compressor, configured to compress an input first refrigerant, a first temperature sensor, configured to detect a first temperature of the first refrigerant input to the compressor, a first heat exchanger, configured to cool the first refrigerant compressed by the compressor, a depressurization apparatus, configured to obtain information about the first temperature from the first temperature sensor, and depressurize, based on the first temperature, the first refrigerant cooled by the heat exchanger, so that the first temperature falls within a first temperature range, a cooling plate, configured to enable the first refrigerant depressurized by the depressurization apparatus to exchange heat with a refrigerated object, and a heater, configured to heat the first refrigerant output from the cooling plate, where a refrigeration medium heated by the heater is input to the compressor.

To be specific, the cooling system includes a first refrigerant circulation system including the compressor, the heat exchanger, the depressurization apparatus, and the cooling plate, and a control system including the first temperature sensor and the depressurization apparatus. The first temperature sensor is configured to detect the first temperature of the first refrigerant input to the compressor. The depressurization apparatus is configured to depressurize, based on the first temperature, the first refrigerant cooled by the heat exchanger, so that the first temperature falls within the first temperature range. The first refrigerant circulation system further includes the heater, configured to heat the first refrigerant output from the cooling plate to the compressor.

Optionally, a heat release source of the heater includes the first refrigerant compressed by the compressor.

Optionally, the heater is configured to enable the first refrigerant compressed by the compressor to exchange heat with the first refrigerant output from the cooling plate.

Optionally, the cooling plate is connected to the compressor through a first pipe, the compressor is connected to the first heat exchanger through a second pipe, and the heater is configured to enable a portion of the first pipe to exchange heat with a portion of the second pipe.

Optionally, the heater is configured to enable the first refrigerant to exchange heat with a second refrigerant.

A function of the heater is implemented using an external refrigerant, so that a change in a line of a pipe of a refrigeration cycle can be reduced.

Optionally, the second refrigerant includes external air.

In this case, the cooling system further includes a fan, configured to control a flow rate of the external air.

Optionally, a vehicle temperature management system further includes a second temperature sensor, configured to detect a second temperature of the first refrigerant at an inlet of the cooling plate, and a controller, communicatively connected to the first temperature sensor and the second temperature sensor, to control a rotation speed of the fan based on the first temperature and the second temperature.

Optionally, the controller is configured to, if a difference between the first temperature and the second temperature is greater than a second threshold, increase the rotation speed of the fan until the difference between the first temperature and the second temperature falls within a second temperature range.

A highest temperature in the second temperature range is the second threshold.

For example, the second threshold may be 6° C. or 7° C.

Optionally, the controller is configured to, if a difference between the first temperature and the second temperature is less than a third threshold, decrease the rotation speed of the fan until the difference between the first temperature and the second temperature falls within a second temperature range.

A lowest temperature in the second temperature range is the third threshold.

For example, the third threshold may be 3° C. or 4° C.

Optionally, the second temperature range is determined based on a superheat degree corresponding to the depressurization apparatus.

To be specific. Ta=ΔT+C.

$$Tb=\Delta T-C.$$

Ta represents the second threshold. Tb represents the third threshold, and ΔT represents the superheat degree corresponding to the depressurization apparatus. For example, a value of ΔT may be 5° C. C may be a preset system threshold. For example, a value of C may be 1° C. or 2° C., or a value of C may be any temperature value between 1° C. and 2° C.

According to a fourth aspect, a heating system is provided, including a compressor, configured to compress an input first refrigerant, a first temperature sensor, configured to detect a first temperature of the first refrigerant input to the compressor, a heating plate, configured to enable the first refrigerant output from the compressor to exchange heat with a heated object, a depressurization apparatus, configured to obtain information about the first temperature from the first temperature sensor, and depressurize, based on the first temperature, the first refrigerant that undergoes heat exchange in the heating plate, so that the first temperature falls within a first temperature range, a first heat exchanger, configured to cool the first refrigerant depressurized by the depressurization apparatus, where the cooled first refrigerant is input to the compressor, and a cooler, configured to cool the first refrigerant output from the compressor.

To be specific, the cooling system includes a first refrigerant circulation system including the compressor, the heat exchanger, the depressurization apparatus, and the heating plate, and a control system including the first temperature sensor and the depressurization apparatus. The first temperature sensor is configured to detect the first temperature of the first refrigerant input to the compressor. The depressurization apparatus is configured to depressurize, based on the first temperature, the first refrigerant cooled by the heat exchanger, so that the first temperature falls within the first temperature range. The first refrigerant circulation system further includes the cooler, configured to cool the first refrigerant output from the compressor to the cooling plate.

Optionally, a heat absorption source of the heater includes the first refrigerant cooled by the first heat exchanger.

Optionally, the heater is configured to enable the first refrigerant compressed by the compressor to exchange heat with the first refrigerant output from the first heat exchanger.

Optionally, the heating plate is connected to the compressor through a first pipe, the compressor is connected to the first heat exchanger through a second pipe, and the cooler is configured to enable a portion of the first pipe to exchange heat with a portion of the second pipe.

Optionally, the heater is configured to enable the first refrigerant to exchange heat with a second refrigerant.

A function of the heater is implemented using an external refrigerant, so that a change in a line of a pipe of a refrigeration cycle can be reduced.

Optionally, the second refrigerant includes external air.

In this case, the cooling system further includes a fan, configured to control a flow rate of the external air.

Optionally, a vehicle temperature management system further includes a second temperature sensor, configured to detect a second temperature of the first refrigerant at an inlet of the heating plate, a third temperature sensor, configured to detect a third temperature of the first refrigerant at an outlet of the compressor, and a controller, communicatively connected to the second temperature sensor and the third temperature sensor, to control a rotation speed of the fan based on the second temperature and the third temperature.

Optionally, the controller is configured to, if a difference between the third temperature and the second temperature is greater than a second threshold, increase the rotation speed of the fan until the difference between the third temperature and the second temperature falls within a second temperature range.

Optionally, the controller is configured to, if a difference between the third temperature and the second temperature is less than a third threshold, decrease the rotation speed of the fan until the difference between the third temperature and the second temperature falls within a second temperature range.

A highest temperature in the second temperature range is the second threshold.

For example, the second threshold may be 2° C.

A lowest temperature in the second temperature range is the third threshold.

For example, the second threshold may be 1□.

Optionally, a management object is a vehicle battery.

According to the vehicle temperature management system provided in this application, when the management object needs to be cooled through the heat exchange plate 150, the refrigerant that flows from the heat exchange plate 150 to the compressor 110 through the four-way valve 160 can be heated through the second heat exchanger 180. To be specific, if the temperature of the refrigerant that flows out of the heat exchange plate 150 is set to t1, and the temperature of the refrigerant (namely, the refrigerant input to the compressor 110) heated by the second heat exchanger 180 is set to t2, it may be determined that t2>t1. t2 is detected using the first temperature sensor 120, and the depressurization apparatus 140 is controlled based on t2, so that t2 falls within the temperature range. This can ensure that t1 is lower than the refrigerant temperature at the inlet of the compressor 110, and further reduce the temperature difference between the input port and the output port of the cooling plate. When the management object needs to be heated through the heat exchange plate 150, the refrigerant that flows from the outlet of the compressor 110 to the heat exchange plate 150 through the four-way valve 160 can be cooled through the second heat exchanger 180. To be specific, if the temperature of the refrigerant that flows out of the compressor 110 is set to t3, and the temperature of the refrigerant (namely, the refrigerant input to the heat exchange plate 150) cooled by the second heat exchanger 180 is set to t4, it may be determined that t3>t4. This further avoids the excessively high refrigerant temperature at the inlet of the heat exchange plate 150, and can further reduce the temperature difference between the input port and the output port of the cooling plate. Therefore, according to the vehicle temperature management system in this application, evenness of temperature distribution of the heat exchange plate can be improved.

DESCRIPTION OF EMBODIMENTS

The following describes technical solutions of this application with reference to accompanying drawings.

A vehicle temperature management system in this application can use a refrigerant to heat or cool a management object.

The refrigerant may also be referred to as a coolant, a cooling fluid, or a refrigerating medium, and is a medium substance for energy conversion in various heat engines. The substance typically increases power with a reversible phase transition (for example, a gas-liquid phase transition).

In this application, the refrigerant is working fluid used to transfer heat energy and generate a freezing effect or, the refrigerant may transfer heat through evaporation and condensation.

The refrigerant may be a substance that is easily endothermic to change into a gas and that is easily exothermic to change into a liquid.

For example, the refrigerant is a medium substance in a refrigeration process, and it receives a reduction of temperature from a coolant and then cools another cooled substance.

As an example, instead of a limitation, in this application, the refrigerant may include ammonia, air, water, salt water, a hydrochlorofluorocarbon (or a chlorofluorocarbon), or the like. Common refrigerants used in air conditioning engineering include water and air.

In this application, when being pressed, a gaseous refrigerant releases heat and becomes a liquid. When a high-pressure liquid is depressurized and becomes a gas, heat is absorbed.

Figure 1:
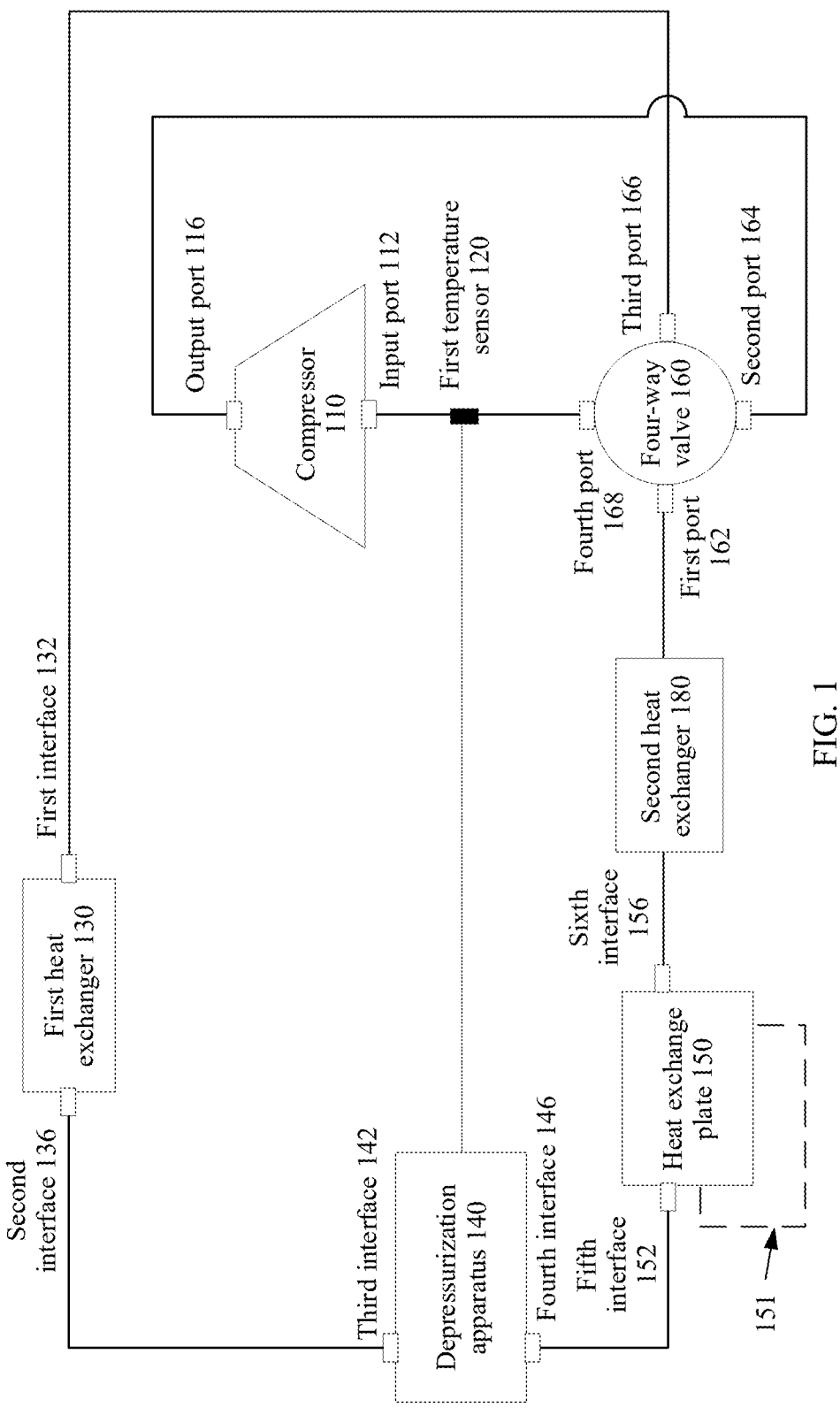
FIG. 1 is a schematic structural diagram of a vehicle temperature management system according to this application.

FIG. 1 shows a schematic structure of a vehicle temperature management system that uses a refrigerant to heat or cool a management object. The vehicle temperature management system may include a circulation system of a refrigerant #A (namely, an example of a first refrigerant).

The following first describes components included in the vehicle temperature management system and connection relationships between the components in the vehicle temperature management system using a loop path of the refrigerant #A.

As shown in FIG. 1, the vehicle temperature management system includes but is not limited to the following components:

A. Compressor 110:

As shown in FIG. 1, the compressor 110 includes an input port 112 and an output port 116.

The low-temperature gaseous refrigerant #A may enter the compressor 110 from the input port 112.

The compressor 110 may compress the gaseous refrigerant #A, so that the refrigerant #A changes from a low-temperature gas state to a high-temperature gas state.

The compressed refrigerant #A is output from the output port 116.

In this application, a temperature of the low-temperature gaseous refrigerant #A that enters the compressor 110 from the input port 112 may be controlled by a depressurization apparatus 140 described later, and this process is described in detail later.

The compressor (gas compressor) is a machine that compresses a gas and lifts pressure of the gas simultaneously.

Based on a working principle, the compressor may be classified into a positive-displacement compressor and an aerodynamic compressor.

The positive-displacement compressor is a compressor that introduces a gas into airtight space, and compresses a space volume scattered by the original gas to increase internal pressure, so as to convert mechanical energy into pressure energy. According to different compression modes of the positive-displacement compressor, the positive-displacement compressor may be classified into a reciprocating compressor, a rotary compressor, a scroll compressor, a spiral compressor, and the like.

The aerodynamic compressor is a compressor that uses high-speed rotation of an impeller to force a gas to flow at a high speed to generate kinetic energy, and in a process of passing through a booster ring, increases a section area to decrease a flow rate of air, so that the kinetic energy of the gas is converted into pressure energy and pressure is increased. Generally, this type of compressors includes a centrifugal compressor, an axial flow compressor, and the like.

According to a lubrication mode, the compressor may be classified into an oil-free air compressor and an oil-lubricated air compressor. According to performance, the compressor may be classified into a low noise compressor, a variable frequency compressor, and an explosion-proof compressor. According to performance, the compressor may be classified into a stationary compressor, a mobile compressor, and a closed compressor.

In this application, one compressor may be used, or a plurality of compressors connected in parallel or in series may be used. This is not limited in this application.

B. First Temperature Sensor 120:

The first temperature sensor 120 may be disposed near the input port 112 of the compressor 110.

In addition, the first temperature sensor 120 may be configured to detect a temperature #A (namely, an example of a first temperature) of the refrigerant #A input to the input port 112 of the compressor 110.

In addition, the first temperature sensor 120 may be communicatively connected to the depressurization apparatus 140 described later, so that the first temperature sensor 120 may send information about the detected temperature #A to the depressurization apparatus 140.

C. First Heat Exchanger 130:

As shown in FIG. 1, the first heat exchanger 130 includes a first interface 132 and a second interface 136.

The refrigerant #A may enter the first heat exchanger 130 from the first interface 132, and be discharged from the first heat exchanger 130 from the second interface 136.

Alternatively, the refrigerant #A may enter the first heat exchanger 130 from the second interface 136, and be discharged from the first heat exchanger 130 from the first interface 132.

The first heat exchanger 130 may enable the refrigerant #A to exchange heat with a refrigerant #B, to cool the refrigerant #A.

As an example, instead of a limitation, the refrigerant #B may be external air. In this case, the first heat exchanger may further include a fan #A (not shown in the figure) configured to control a flow rate (or control a cooling speed) of the external air.

The heat exchanger (or a heat exchange apparatus or a heat exchange device) is an apparatus configured to transfer heat from a heat fluid to a cold fluid to meet a specified process requirement, and is an industrial application of convective heat transfer and heat conduction.

In this application, a condenser may be used to implement a function of the first heat exchanger 130. The condenser is a device that condenses a gaseous substance into a liquid. The condenser is a common heat exchanger and generally condenses a substance in a cooling manner. The substance releases latent heat and partial sensible heat in a condensation process, to increase a refrigerant temperature of the condenser.

In this application, the first heat exchanger 130 may transfer heat from the refrigerant #A to the refrigerant #B (for example, air or cooling water).

As an example, instead of a limitation, the first heat exchanger 130 may be disposed outside a cabin (for example, outside a vehicle cabin), so that the refrigerant #A may exchange heat with an external environment, to be specific, release heat or cooling to the external environment.

In addition, in this application, one out-of-vehicle heat exchanger may be used, or a plurality of out-of-vehicle heat exchangers connected in parallel or in series may be used.
D. Depressurization Apparatus 140:

As shown in FIG. 1, the depressurization apparatus 140 includes a third interface 142 and a fourth interface 146.

The refrigerant #A may enter the depressurization apparatus 140 from the third interface 142, and be discharged from the depressurization apparatus 140 from the fourth interface 146.

Alternatively, the refrigerant #A may enter the depressurization apparatus 140 from the fourth interface 146, and be discharged from the depressurization apparatus 140 from the third interface 142.

As shown in FIG. 1, the third interface 142 is connected to the second interface 136 through a pipe, to be specific, a cooling medium can flow between the third interface 142 and the second interface 136 through the pipe.

The depressurization apparatus 140 may perform depressurization (or pressure release or throttling) on the input high-pressure refrigerant #A, to obtain the low-temperature refrigerant #A.

As an example, instead of a limitation, the depressurization apparatus 140 may include an expansion valve (not shown in the figure).

The expansion valve may also be referred to as a thermal expansion valve or a throttle valve.

The expansion valve is configured to throttle the medium-temperature and high-pressure liquid refrigerant into the low-temperature and low-pressure wet vapor. Then, the refrigerant absorbs heat in a heat exchange plate to achieve a cooling effect.

In this application, the expansion valve includes a valve body, a sensing bulb, and an equalizing pipe.

A refrigerant filled in the sensing bulb is in a gas-liquid equilibrium saturation state. The refrigerant in the sensing bulb is not connected to the refrigerant in the system. The refrigerant is usually tied to an outlet pipe of an evaporator, and is in close contact with the pipe to sense an overheated vapor temperature at an outlet of the evaporator. Because the refrigerant inside the sensing bulb is saturated, pressure at the saturated state and at the temperature is transferred to the valve body based on the temperature.

One end of the equalizing pipe is connected to a position in which the outlet of the evaporator is slightly away from the sensing bulb, and is directly connected to the valve body through a capillary pipe, to transfer actual pressure at the outlet of the evaporator to the valve body. There is a two-diaphragm inside the valve body. The diaphragm moves upwards under a pressure action to reduce a flow volume of the refrigerant through the expansion valve and seek balance in a dynamic state.

The thermal expansion valve, usually referred to as the expansion valve, is installed at an inlet of the evaporator and provides the following two functions:

(1) A throttling function: The high-temperature and high-pressure liquid refrigerant becomes the low-temperature and low-pressure fog-like hydraulic refrigerant after being throttled through a throttle hole of the expansion valve, to create a condition for evaporation of the refrigerant.

(2) Controlling the flow volume of the refrigerant: After the liquid refrigerant enters the evaporator and passes through the evaporator, the refrigerant changes from a liquid state to a gas state to absorb heat and reduce a temperature of a management object 151 (for example, a vehicle battery). The expansion valve controls the flow volume of the refrigerant to ensure that there is only gaseous refrigerant at the outlet of the evaporator. If the flow volume is too large, there is liquid refrigerant at the outlet, and the liquid refrigerant may enter the compressor and cause a liquid strike. If the flow volume of the refrigerant is too small, evaporation is complete in advance, resulting in insufficient cooling.

In this application, the expansion valve may have a parameter of "superheat degree".

To be specific, the expansion valve may control a flow volume of the valve using the superheat degree, to prevent an area of the evaporator from under-utilization and knocking.

The superheat degree refers to a difference between a superheat temperature and a saturation temperature of the refrigerant at a same evaporating pressure in a refrigeration cycle. Alternatively, the superheat degree refers to a difference between a temperature of a vapor on a low-pressure side and a temperature of the vapor in the sensing bulb.

For example, in terms of properties of water and a water vapor, the superheat degree refers to a degree to which a vapor temperature is higher than a saturation temperature under corresponding pressure. For the water and the water vapor, a saturation curve of the water is an ascending curve in a water vapor diagram. To be specific, as pressure increases, a saturation temperature of the water also increases. Similarly, when the water vapor is already overheated, if pressure increases, a saturation temperature corresponding to the water vapor also increases accordingly, and a degree that a temperature of the water vapor is higher than the saturation temperature also decreases. To be specific, a superheat degree of the vapor decreases.

Increasing the superheat degree causes the evaporator (for example, a heat exchange plate 150 described later) to "starve". "Starvation" of the heat exchanger means that only some evaporators are filled with refrigerant droplets. The heat exchanger is referred to as "lack of refrigerant" at this set value.

A value of a superheat degree in a suction pipe is controlled by a type and an adjustment value of a used refrigerant controller.

For the heat exchanger, an optimal superheat degree set value means that a temperature change of the sensing bulb in the thermal expansion valve is the smallest when the system runs. The set value may be referred to as a minimum stable signal (MSS) value. The set value reflects performance of the heat exchanger and performance of the thermal expansion valve.

As an example, instead of a limitation, in this application, a superheat degree corresponding to the depressurization apparatus 140 (or the expansion valve of the depressurization apparatus 140) may be, for example, 5° C.

In addition, the depressurization apparatus 140 is communicatively connected to the first temperature sensor 120, so that the depressurization apparatus 140 may obtain the information about the temperature #A from the first temperature sensor 120.

In addition, the depressurization apparatus 140 may control the expansion valve (for example, control a flow volume or pressure of the refrigerant) based on the temperature #A, so that the temperature #A falls within a preset temperature range #A (namely, an example of a first temperature range). For example, in a cooling mode, the temperature range #A may be about 18° C. (for example, 17° C. to 19° C.).

E. Heat Exchange Plate 150:

As shown in FIG. 1, the heat exchange plate 150 includes a fifth interface 152 and a sixth interface 156.

The refrigerant #A may enter the heat exchange plate 150 from the fifth port 152, and be discharged from the heat exchange plate 150 from the sixth port 156.

Alternatively, the refrigerant #A may enter the heat exchange plate 150 from the sixth interface 156, and be discharged from the heat exchange plate 150 from the fifth interface 152.

As shown in FIG. 1, the fifth interface 152 is connected to the fourth interface 146 through a pipe, to be specific, the cooling medium can flow between the fifth interface 152 and the fourth interface 146 through the pipe.

The heat exchange plate 150 may enable the refrigerant #A to exchange heat with the management object 151 (for example, a battery).

As an example, instead of a limitation, in the cooling mode, the heat exchange plate 150 may implement a function of the evaporator. To be specific, in the cooling mode, the low-temperature and low-pressure refrigerant enters the heat exchange plate, and exchanges heat (for example, through an outer wall of the heat exchange plate) with the management object, to cool the management object. Alternatively, in the cooling mode, the low-temperature and low-pressure refrigerant enters the heat exchange plate 150, and absorbs heat from the outside through an outer wall of the heat exchange plate 150.

In a heating mode, the heat exchange plate 150 may implement a function of the condenser. To be specific, in the heating mode, the high-temperature and high-pressure refrigerant enters the heat exchange plate, and exchanges heat (for example, through an outer wall of the heat exchange plate) with the management object, to heat the management object. Alternatively, in the heating mode, the high-temperature and high-pressure refrigerant enters the heat exchange plate 150, and releases heat to the outside through an outer wall of the heat exchange plate 150.

As an example, instead of a limitation, the heat exchange plate 150 may be made of a material with a good thermal conductivity, for example, a metal material (for example, an alloy material such as iron, copper, or stainless steel).

The heat exchange plate 150 may be configured to cool a battery, and is disposed at the bottom or a side of the battery. The heat exchange plate 150 includes a flow channel. A refrigerant is injected to cool or heat the battery. A battery cold plate may be designed based on a real-vehicle battery pack, so that a plurality of flow channels is connected in series or in parallel.

F. Four-Way Valve 160:

As shown in FIG. 1, the four-way valve 160 includes a first port 162, a second port 164, a third port 166, and a fourth port 168.

In addition, as shown in FIG. 1, the first port 162 is connected to the sixth interface 156, the second port 164 is connected to the output port 116, the third port 166 is connected to the first interface 132, and the fourth port 168 is connected to the input port 112.

The four-way valve 160 may include a controller #A (for example, an electromagnetic valve and a pilot slide valve) that is not shown in the figure. The controller #A may control connection and disconnection between any two ports of the first port 162, the second port 164, the third port 166, and the fourth port 168.

The four-way valve may also be referred to as a four-way reversing valve, and is a control valve having four ports (which may also be referred to as interfaces or oil ports). As an example, instead of a limitation, in this application, a working principle of the four-way valve 160 is as follows. When an electromagnetic valve coil is in a power-off state, the pilot slide valve moves leftwards when driven by a right compression spring. A high-pressure gas enters a right piston cavity after entering a capillary tube, and the gas is discharged from a left piston cavity. Because a pressure difference exists between two ends of a piston, the piston and a main slide valve move leftwards, so that the second port 164 is connected to the third port 166, and the first port 162 is connected to the fourth port 168. In this way, a refrigeration cycle is constituted in the vehicle temperature management system. In other words, the vehicle temperature management system is switched to the cooling mode.

When an electromagnetic valve coil is in a power-on state, under an action of a magnetic force generated by the solenoid coil, the pilot slide valve overcomes tension of a compression spring and moves rightwards. A high-pressure gas enters a left piston cavity after entering a capillary tube, and the gas in a right piston cavity is discharged. Because a pressure difference exists between two ends of a piston, the piston and a main slide valve move rightwards, so that the first port 162 is connected to the second port 164, and the third port 166 is connected to the fourth port 168. In this way, a heating cycle is constituted in the vehicle temperature management system. In other words, the vehicle temperature management system is switched to the heating mode.

Figure 5:
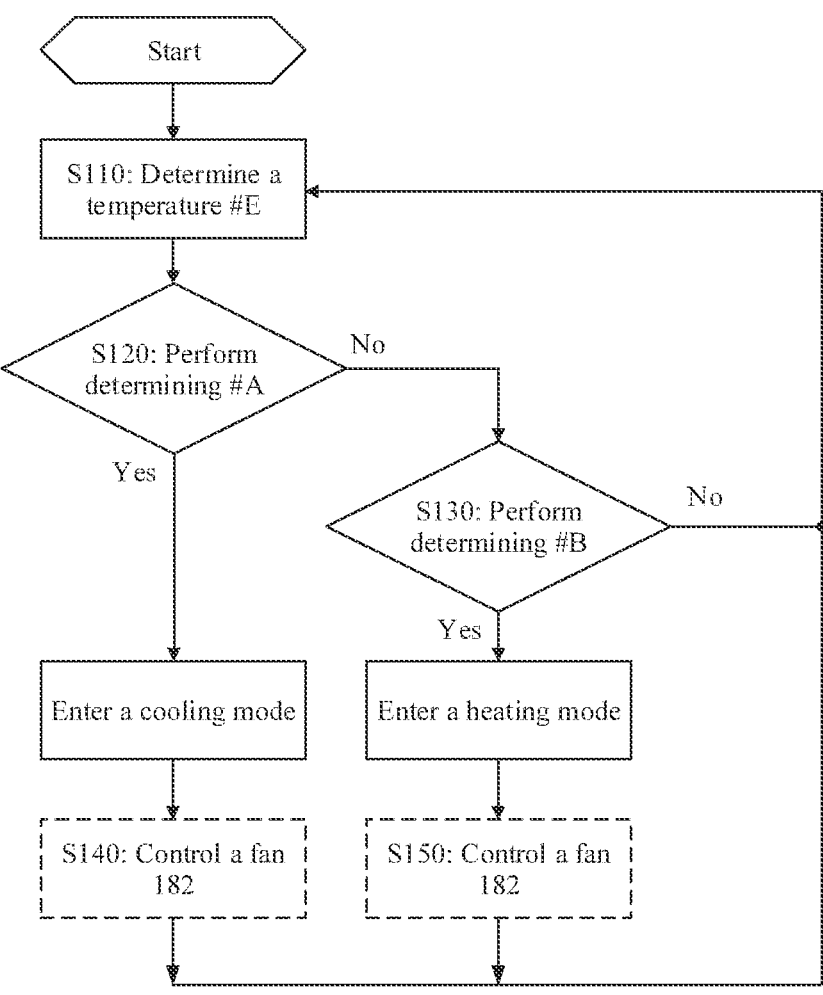
FIG. 5 is a schematic flowchart of an example of a control method applicable to a vehicle temperature management system according to this application.

FIG. 5 is a schematic diagram of an example of a control process of the controller #A.

In this application, a temperature sensor #E (not shown in the figure) for detecting a temperature (denoted as a temperature #E) of a management object may be disposed, and the controller #A may be communicatively connected to the temperature sensor #E.

Therefore, in S110, the controller #A may obtain information about the temperature #E from the temperature sensor #E.

In S120, the controller #A may perform determining #A, where determining #A may be determining used to enable the controller #A to determine whether to switch the four-way valve 160 to the cooling mode (to be specific, whether to enable the second port 164 to be connected to the third port 166, and whether to enable the first port 162 to be connected to the fourth port 168).

As an example, instead of a limitation, determining #A may include determining whether the temperature #E is greater than or equal to a preset temperature threshold #1.

If a determining result is yes (to be specific, the temperature #E is greater than or equal to the preset temperature threshold #1), the controller #A may switch the four-way valve 160 to the cooling mode (to be specific, enable the second port 164 to be connected to the third port 166, and enable the first port 162 to be connected to the fourth port 168).

As an example, instead of a limitation, the temperature threshold #1 may be determined based on a safe temperature of the management object. For example, if the management object is a vehicle battery, the temperature threshold #1 is a highest ambient temperature at which the management object can work safely. For example, the temperature threshold #1 may be 35° C.

It should be understood that a specific temperature of the temperature threshold #1 listed above is merely an example for description, and this application is not limited thereto.

Optionally, after the cooling mode is switched to, a fan 182 of a second heat exchanger 180 described later may be further controlled in S140, and this step is later described in detail with reference to FIG. 6.

In S130, the controller #A may perform determining #B, where determining #B may be determining used to enable the controller #A to determine whether to switch the four-way valve 160 to the heating mode (to be specific, whether to enable the first port 162 to be connected to the second port 164, and whether to enable the third port 166 to be connected to the fourth port 168).

As an example, instead of a limitation, determining #B may include determining whether the temperature #E is less than or equal to a preset temperature threshold #2.

If a determining result is yes (to be specific, the temperature #E is less than or equal to the preset temperature threshold #2), the controller #A may switch the four-way valve 160 to the heating mode (to be specific, enable the first port 162 to be connected to the second port 164, and enable the third port 166 to be connected to the fourth port 168).

As an example, instead of a limitation, the temperature threshold #2 may be determined based on a working temperature of the management object. For example, if the management object is a vehicle battery, the temperature threshold #2 is a lowest ambient temperature at which the management object can work normally. For example, the temperature threshold #2 may be 20° C.

It should be understood that a specific temperature of the temperature threshold #2 listed above is merely an example for description, and this application is not limited thereto.

It should be noted that S120 may be performed before S130. In this case, if the determining result of determining #A is no, S130 is performed. In addition, in this case, if the determining result of determining #B is no, a current working state is maintained.

Alternatively, S130 may be performed before S120. In this case, if the determining result of determining #B is no, S120 is performed. In addition, in this case, if the determining result of determining #A is no, a current working state is maintained.

Optionally, after the heating mode is switched to, a fan 182 of a second heat exchanger 180 described later may be further controlled in S150, and this step is later described in detail with reference to FIG. 7.

G. Second Heat Exchanger 180:

In this application, the second heat exchanger 180 may be disposed on a transmission path of the refrigerant #A between the heat exchange plate 150 and the compressor 110.

For example, as shown in FIG. 1, on the transmission path of the refrigerant #A, the second heat exchanger 180 may be disposed between the heat exchange plate 150 and the four-way valve 160.

It should be noted that a disposing position of the second heat exchanger 180 shown in FIG. 1 is merely an example for description, and this application is not limited thereto. For example, on the transmission path of the refrigerant #A, the second heat exchanger 180 may alternatively be disposed between the four-way valve 160 and the compressor 110.

In this application, when the management object needs to be cooled through the heat exchange plate 150, to be specific, when the vehicle temperature management system is switched to the cooling mode, the second heat exchanger 180 may heat the refrigerant #A that flows from the sixth interface 156 to the input port 112.

When the management object needs to be heated through the heat exchange plate 150, to be specific, when the vehicle temperature management system is switched to the heating mode, the refrigerant #A that flows from the output port 116 to the sixth interface 156 is cooled.

Assuming that a heat exchange target (namely, a heated target in the cooling mode or a cooled target in the heating mode) of the second heat exchanger 180 is a refrigerant #A-1, in the cooling mode, the refrigerant #A-1 may belong to the refrigerant #A that flows from the sixth interface 156 of the heat exchange plate 150 to the input port 112 of the compressor 110. In the heating mode, the refrigerant #A-1 may belong to the refrigerant #A that flows from the output port 116 of the compressor 110 to the sixth interface 156 of the heat exchange plate 150.

Alternatively, assuming that a pipe between the heat exchange plate 150 and the compressor 110 is a pipe #A, the pipe #A may include a pipe connecting the heat exchange plate 150 and the four-way valve 160, and a pipe connecting the four-way valve 160 and the compressor 110. In this case, the second heat exchanger 180 may implement a heat exchange process of the refrigerant #A-1 by heating or cooling a portion (denoted as a portion #A) of the pipe #A.

As an example, instead of a limitation, the second heat exchanger 180 in this application may be configured in at least one of the following manners.

Manner 1:

Further, a substance that exchanges heat with the refrigerant #A-1 may be a refrigerant #A-2 in the refrigerant #A.

To be specific, in the cooling mode, the refrigerant #A-2 may belong to the refrigerant #A that flows from the output port 116 of the compressor 110 to the first interface 132 of the first heat exchanger 130.

In the heating mode, the refrigerant #2 may belong to the refrigerant #A that flows from the first interface 132 of the first heat exchanger 130 to the input port 112 of the compressor 110.

Alternatively, assuming that a pipe between the first heat exchanger 130 and the compressor 110 is a pipe #B, the pipe #B may include a pipe connecting the first heat exchanger 130 and the four-way valve 160, and a pipe connecting the four-way valve 160 and the compressor 110. In this case, the second heat exchanger 180 may enable the portion #A to exchange heat with a portion (denoted as a portion #B) of the pipe #B, to implement a heat exchange process between the refrigerant #A-1 and the refrigerant #A-2.

The second heat exchanger 180 in Manner 1 may have any one of the following structures.

Figure 2:
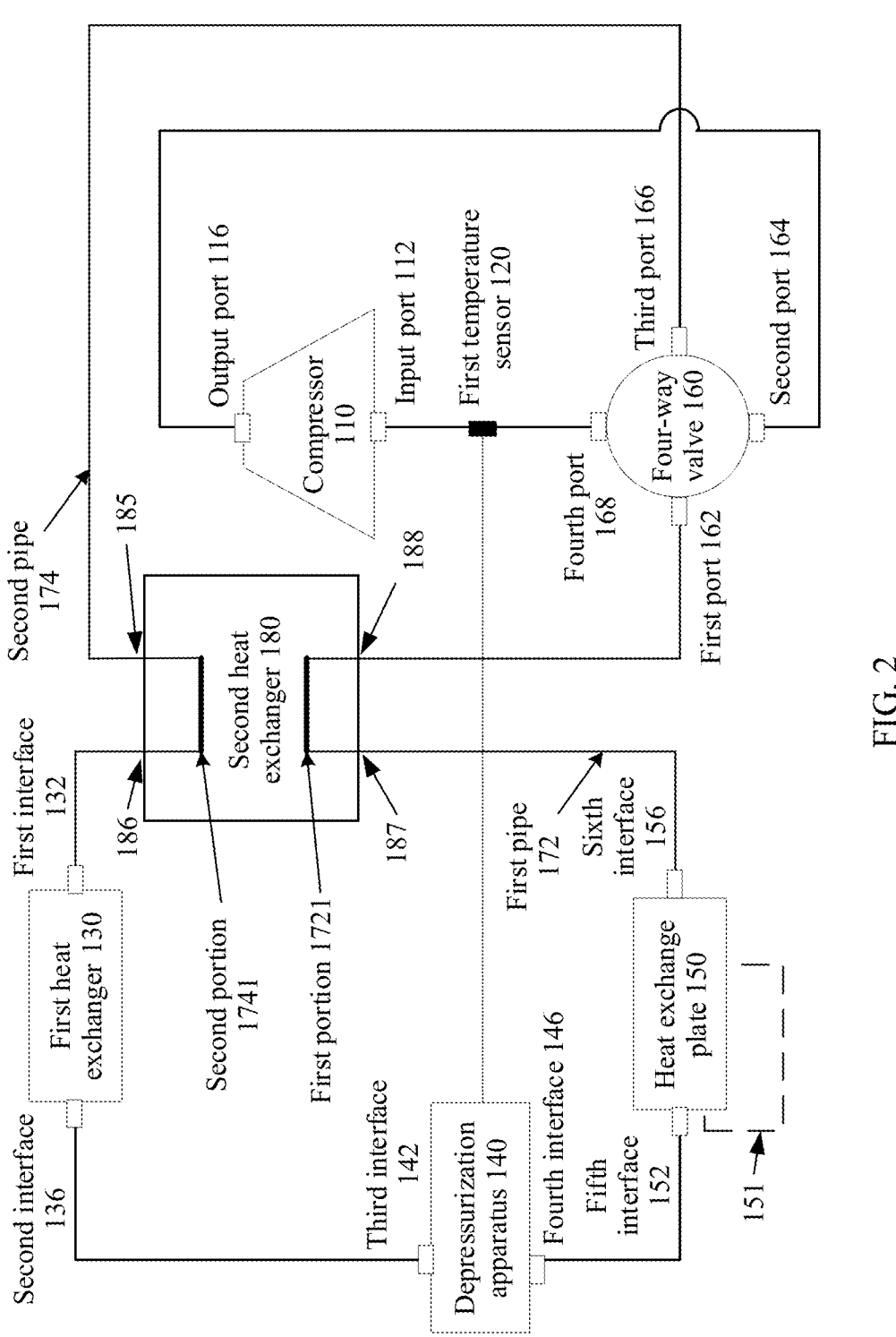
FIG. 2 is a schematic diagram of an example of a configuration mode of a second heat exchanger 180 according to this application.

Structure 1:

As shown in FIG. 2, the portion #A may include a portion of a first pipe 172 connecting the heat exchange plate 150 and the four-way valve 160, namely, a first portion 1721.

The portion #B may include a portion of a second pipe 174 connecting the first heat exchanger 130 to the four-way valve 160, namely, a second portion 1741.

Therefore, the second portion 1741 and the first portion 1721 may exchange heat in the second heat exchanger 180. In addition, as shown in FIG. 2, the second heat exchanger 180 comprises a seventh interface 185 connected to the third port 166, an eighth interface 186 connected to the first interface 132, a ninth interface 187 connected to the sixth interface 156, and a tenth interface 188 connected to the first port 162.

Further, in the cooling mode, the refrigerant #A-2 that flows in the second portion 1741 is a high-temperature and high-pressure refrigerant that is not depressurized by the depressurization apparatus 140, and the refrigerant #A-1 that flows in the first portion 1721 is a low-temperature and low-pressure refrigerant that is depressurized by the depressurization apparatus 140. To be specific, a temperature (or heat) of the refrigerant #A-2 is higher than a temperature (or heat) of the refrigerant #A-1. Therefore, the refrigerant #A-2 and the refrigerant #A-1 exchange heat in the second heat exchanger 180 through a pipe wall of the second portion 1741 and a pipe wall of the first portion 1721. Therefore, the refrigerant #A-1 can be heated.

In the heating mode, the refrigerant #A-2 that flows in the second portion 1741 is a low-temperature and low-pressure refrigerant that is depressurized by the depressurization apparatus 140, and the refrigerant #A-1 that flows in the first portion 1721 is a high-temperature and high-pressure refrigerant that is not depressurized by the depressurization apparatus 140. To be specific, a temperature (or heat) of the refrigerant #A-2 is lower than a temperature (or heat) of the refrigerant #A-1. Therefore, the refrigerant #A-2 and the refrigerant #A-1 exchange heat in the second heat exchanger 180 through a pipe wall of the second portion 1741 and a pipe wall of the first portion 1721. Therefore, the refrigerant #A-1 can be cooled.

Figure 3:
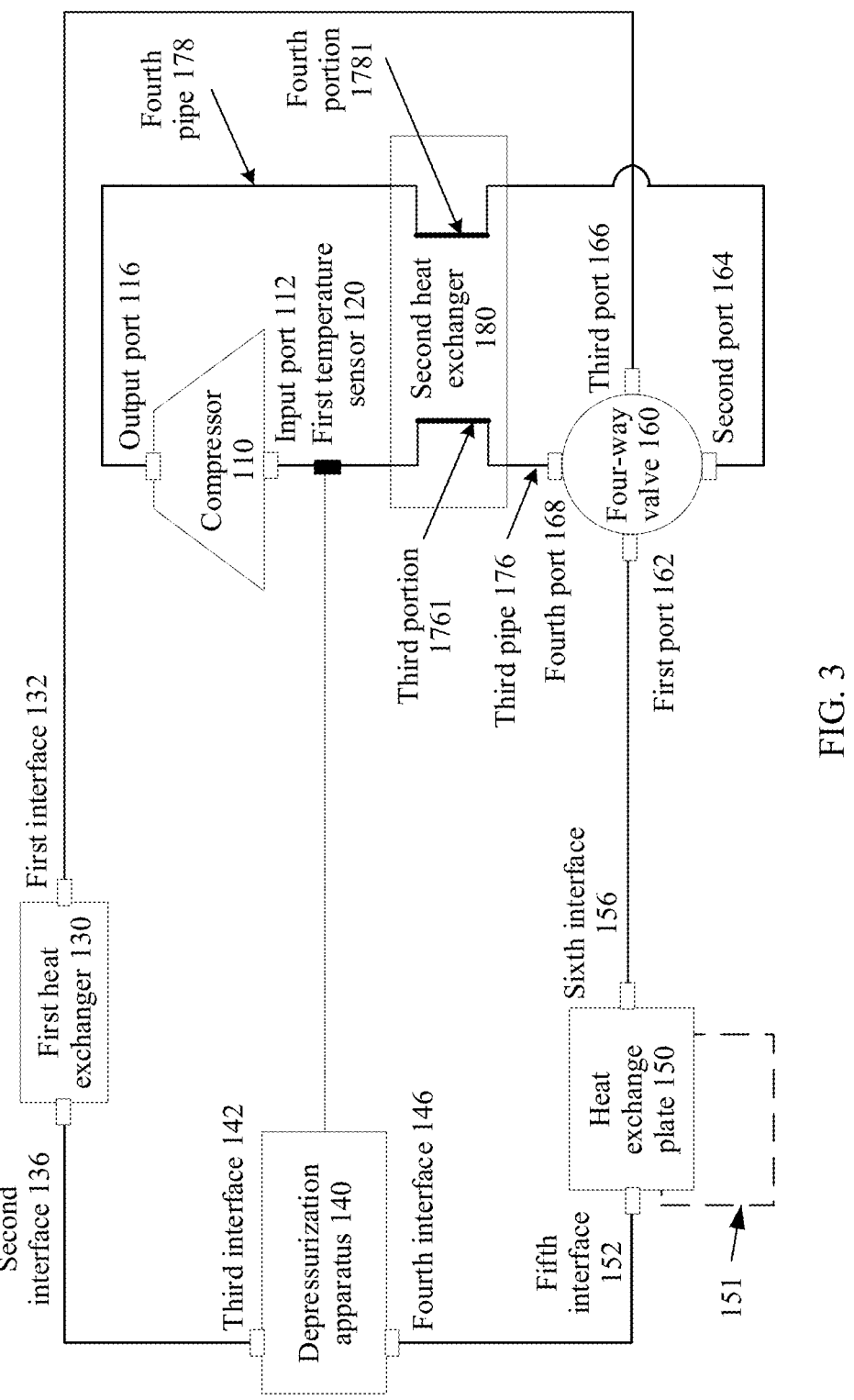
FIG. 3 is a schematic diagram of another example of a configuration mode of a second heat exchanger according to this application.

Structure 2:

As shown in FIG. 3, the portion #A may include a portion of a third pipe 176 connecting the input port 112 of the compressor 110 to the four-way valve 160, namely, a third portion 1761.

The portion #B may include a portion of a fourth pipe 178 connecting the output port 116 of the compressor 110 to the four-way valve 160, namely, a fourth portion 1781.

Therefore, the third portion 1761 and the fourth portion 1781 may exchange heat in the second heat exchanger 180.

Further, in the cooling mode, the refrigerant #A-2 that flows in the fourth portion 1781 is a high-temperature and high-pressure refrigerant that is not depressurized by the depressurization apparatus 140, and the refrigerant #A-1 that flows in the third portion 1761 is a low-temperature and low-pressure refrigerant that is depressurized by the depressurization apparatus 140. To be specific, a temperature (or heat) of the refrigerant #A-2 is higher than a temperature (or heat) of the refrigerant #A-1. Therefore, the refrigerant #A-2 and the refrigerant #A-1 exchange heat in the second heat exchanger 180 through a pipe wall of the third portion 1761 and a pipe wall of the fourth portion 1781. Therefore, the refrigerant #A-1 can be heated.

In the heating mode, the refrigerant #A-2 that flows in the fourth portion 1781 is a low-temperature and low-pressure refrigerant that is depressurized by the depressurization apparatus 140, and the refrigerant #A-1 that flows in the third portion 1761 is a high-temperature and high-pressure refrigerant that is not depressurized by the depressurization apparatus 140. To be specific, a temperature (or heat) of the refrigerant #A-2 is lower than a temperature (or heat) of the refrigerant #A-1. Therefore, the refrigerant #A-2 and the refrigerant #A-1 exchange heat in the second heat exchanger 180 through a pipe wall of the third portion 1761 and a pipe wall of the fourth portion 1781. Therefore, the refrigerant #A-1 can be cooled.

As an example, instead of a limitation, in this application, in Manner 1, to increase heat exchange efficiency, a material of the first portion 1721, the second portion 1741, the third portion 1761, or the fourth portion 1781 may be a material with a relatively high thermal conductivity, for example, a metal material.

In addition, in this application, a material of a portion of the pipe 170 other than the first portion 1721, the second portion 1741, the third portion 1761, or the fourth portion 1781 may be a material with a relatively low thermal conductivity, so that heat exchange efficiency of the refrigerant #A-1 can be improved, and a heat loss of the refrigerant #A in a transmission process can be avoided.

Alternatively, in this application, the pipe 170 may be a multilayer composite pipe, and the first portion 1721, the second portion 1741, the third portion 1761, or the fourth portion 1781 may be an inner pipe portion that is not wrapped with a thermal insulation material. A portion of the pipe 170 other than the first portion 1721, the second portion 1741, the third portion 1761, or the fourth portion 1781 may be wrapped with the thermal insulation material outside an inner pipe, so that heat exchange efficiency of the refrigerant #A-1 can be improved, and a heat loss of the refrigerant #A in a transmission process can be avoided.

Manner 2:

Further, a substance that exchanges heat with the refrigerant #A-1 may be an external refrigerant, and is denoted as a refrigerant #B.

To be specific, in the cooling mode, a temperature of the refrigerant #B may be enabled to be higher than a temperature of the refrigerant #A1, so that the refrigerant #A1 may be heated using the refrigerant #B.

In the heating mode, a temperature of the refrigerant #A may be enabled to be lower than a temperature of the refrigerant #A1, so that the refrigerant #A1 may be cooled using the refrigerant #B.

In addition, generally, the temperature (for example, about 18° C.) of the refrigerant #A1 in the cooling mode is lower than a room temperature (for example, a temperature in a vehicle cabin). The temperature (for example, about 61° C.) of the refrigerant #A in the heating mode is higher than a room temperature (for example, a temperature in the vehicle cabin).

Therefore, as an example instead of a limitation, in this application, air at the room temperature may be used as the refrigerant B.

Figure 4:
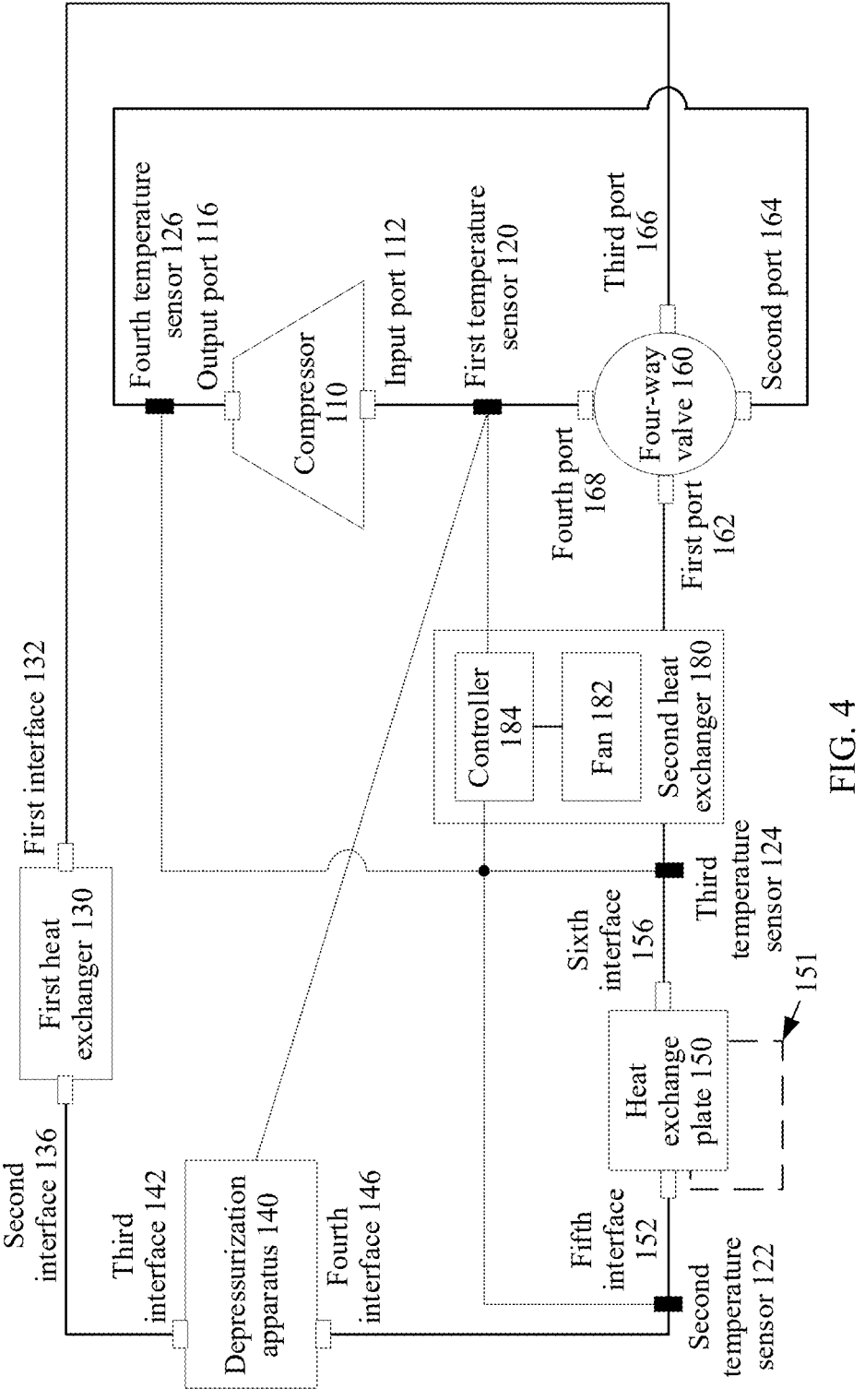
FIG. 4 is a schematic diagram of still another example of a configuration mode of a second heat exchanger according to this application.

To be specific, optionally, as shown in FIG. 4, the second heat exchanger 180 may be disposed indoors (for example, in a vehicle cabin), or air may be introduced from indoors (for example, a vehicle cabin) to the second heat exchanger 180 as the refrigerant B.

In this case, the second heat exchanger 180 may further include a controller 184 and the fan 182. The controller 184 may control a rotation speed of the fan 182, to control the temperature of the refrigerant #A1 output from the second heat exchanger 180.

In addition, in this case, a second temperature sensor 122, a third temperature sensor 124, and a fourth temperature sensor 126 may be configured.

The second temperature sensor 122 may be configured to detect a temperature #B (namely, an example of a second temperature), where the temperature #B may be a temperature of the refrigerant #A that flows in or out of the heat exchange plate 150 from the fifth interface 152.

The third temperature sensor 124 may be configured to detect a temperature #C (namely, an example of a third temperature), where the temperature #C may be a temperature of the refrigerant #A that flows in or out of the heat exchange plate 150 from the sixth interface 156.

The fourth temperature sensor 126 may be configured to detect a temperature #D, where the temperature #D may be a temperature of the refrigerant #A output from the output port 116.

Therefore, the controller 184 may control the rotation speed of the fan 182 based on one or more of the temperature #A, the temperature #B, the temperature #C, or the temperature #D.

Figure 6:
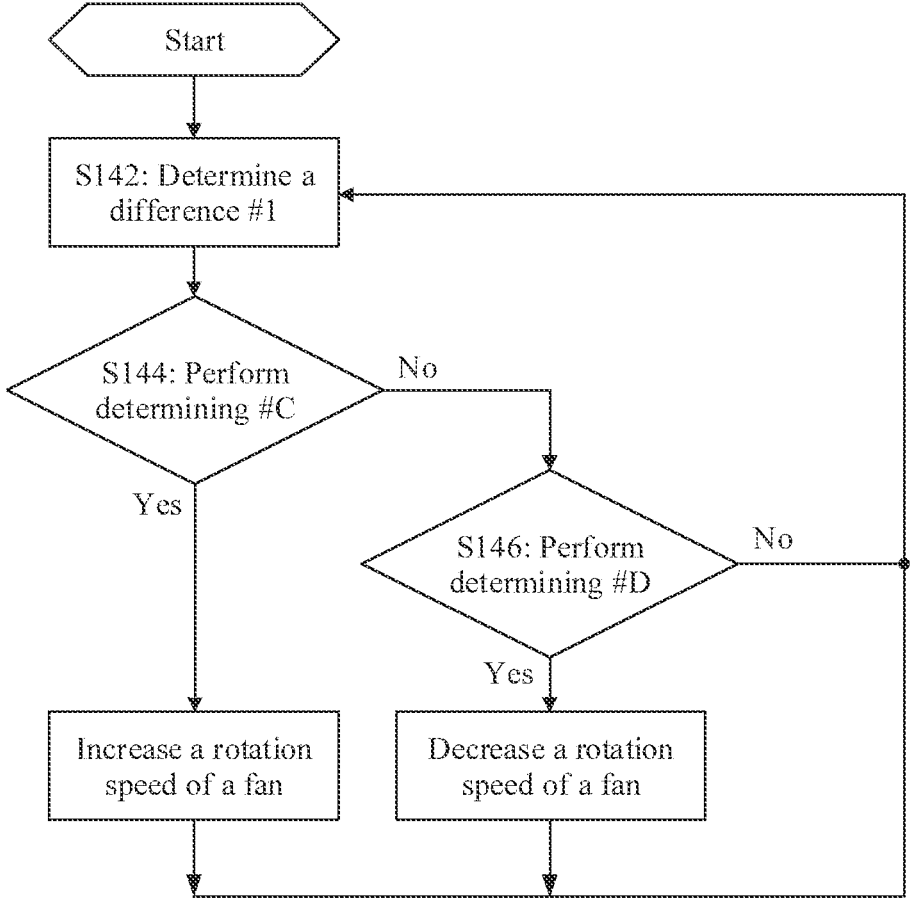
FIG. 6 is a schematic flowchart of another example of a control method applicable to a vehicle temperature management system according to this application.

FIG. 6 shows an example of a control process of the controller 184 in the cooling mode in the foregoing S140. As shown in FIG. 6, in S142, the controller 184 may determine a difference (denoted as a difference #1) between the temperature #A and the temperature #B.

In S144, the controller 184 may perform determining #C, where determining #C may be determining used to enable the controller 184 to determine whether to enable the fan 182 to increase the rotation speed.

As an example, instead of a limitation, determining #C may include determining whether the difference #1 is greater than or equal to a preset temperature threshold #3.

If a determining result is yes (to be specific, the difference #1 is greater than or equal to the preset temperature threshold #3), the controller #A may control the fan 182 to increase the rotation speed.

As an example, instead of a limitation, the temperature threshold #3 may be determined based on a superheat degree corresponding to the depressurization apparatus 140.

For example, it is assumed that the superheat degree corresponding to the depressurization apparatus 140 is ΔT.

In this case, a value of the temperature threshold #3 may be a sum of ΔT and a preset compensation value (denoted as C).

As an example, instead of a limitation, in this application, a value of ΔT may be, for example, 5° C. A value of C may be any temperature value of 1° C. to 2° C., for example, 1° C. or 2° C.

In this application, the value of the temperature threshold #3 may include but is not limited to 6° C. or 7° C.

It should be understood that a specific temperature of the temperature threshold #3 listed above is merely an example for description, and this application is not limited thereto.

In S146, the controller 184 may perform determining #D, where determining #D may be determining used to enable the controller 184 to determine whether to enable the fan 182 to decrease the rotation speed.

As an example, instead of a limitation, determining #D may include determining whether the difference #1 is less than or equal to a preset temperature threshold #4.

If a determining result is yes (to be specific, the difference #1 is less than or equal to the preset temperature threshold #4), the controller #A may control the fan 182 to decrease the rotation speed.

As an example, instead of a limitation, the temperature threshold #4 may be determined based on a superheat degree corresponding to the depressurization apparatus 140.

For example, it is assumed that the superheat degree corresponding to the depressurization apparatus 140 is ΔT.

In this case, a value of the temperature threshold #4 may be a difference between ΔT and a preset compensation value (denoted as C).

As an example, instead of a limitation, in this application, a value of ΔT may be, for example, 5° C. A value of C may be any temperature value of 1° C. to 2° C., for example, 1° C. or 2° C.

In this application, the value of the temperature threshold #4 may include but is not limited to 3□ or 4□.

It should be understood that a specific temperature of the temperature threshold #4 listed above is merely an example for description, and this application is not limited thereto.

It should be noted that S144 may be performed before S146. In this case, if the determining result of determining #C is no, S146 is performed. In addition, in this case, if the determining result of determining #D is no, to be specific, the difference #1 is less than the temperature threshold #3, and the difference #1 is greater than the temperature threshold #4, a current rotation speed of the fan is maintained.

Alternatively, S146 may be performed before S144. In this case, if the determining result of determining #D is no. S144 is performed. In addition, in this case, if the determining result of determining #C is no, to be specific, the difference #1 is less than the temperature threshold #3, and the difference #1 is greater than the temperature threshold #4, a current rotation speed of the fan is maintained.

Figure 7:
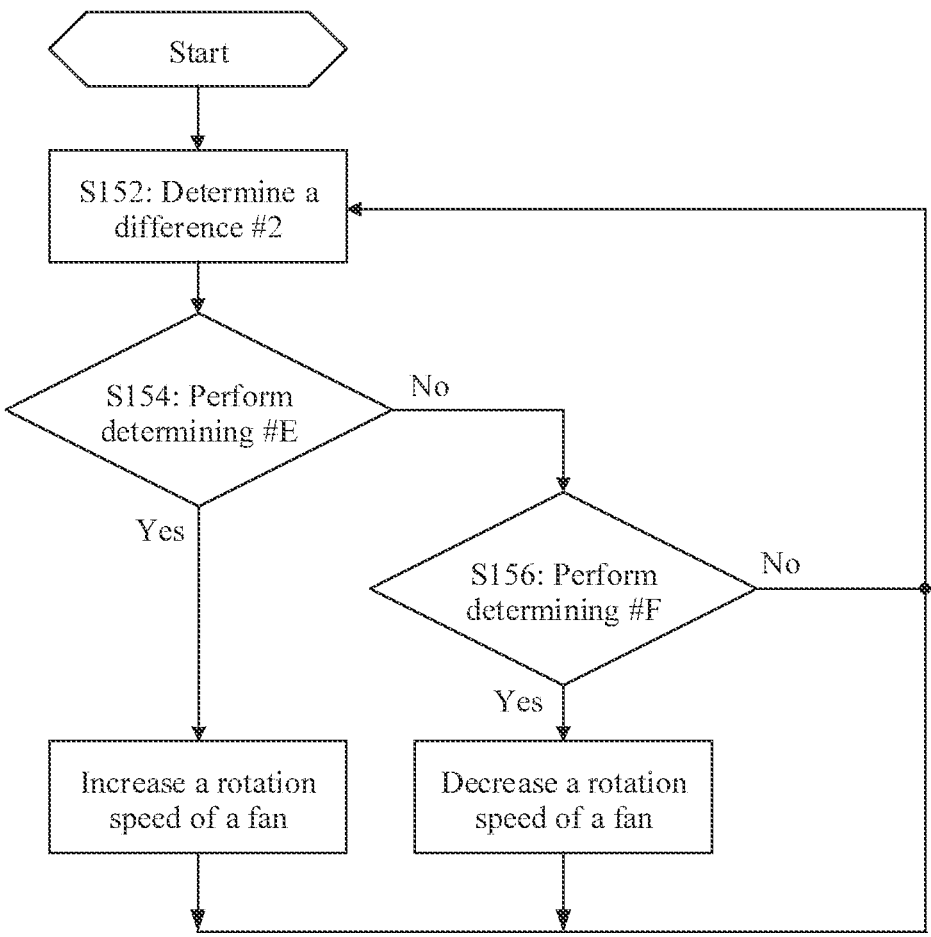
FIG. 7 is a schematic flowchart of still another example of a control method applicable to a vehicle temperature management system according to this application.

FIG. 7 shows an example of a control process of the controller 184 in the cooling mode in the foregoing S150. As shown in FIG. 7, in S152, the controller 184 may determine a difference between the temperature #D and the temperature #C (further, the difference is a difference obtained by subtracting the temperature #C from the temperature #D, and is denoted as a difference #2).

In S154, the controller 184 may perform determining #E, where determining #E may be determining used to enable the controller 184 to determine whether to enable the fan 182 to increase the rotation speed.

As an example, instead of a limitation, determining #E may include determining whether the difference #2 is greater than or equal to a preset temperature threshold #5.

If a determining result is yes (to be specific, the difference #2 is greater than or equal to the preset temperature threshold #5), the controller #A may control the fan 182 to increase the rotation speed.

As an example, instead of a limitation, the temperature threshold #5 may be determined based on a preset compensation value (denoted as C). For example, a value of the temperature threshold #5 may be C.

As an example, instead of a limitation, a value of C may be any temperature value in 1° C. to 2° C., for example, 1° C. or 2° C.

In this application, the value of the temperature threshold #5 may include but is not limited to 1□ or 2□.

It should be understood that a specific temperature of the temperature threshold #5 listed above is merely an example for description, and this application is not limited thereto.

In S156, the controller 184 may perform determining #F, where determining #F may be determining used to enable the controller 184 to determine whether to enable the fan 182 to decrease the rotation speed.

As an example, instead of a limitation, determining #D may include determining whether the difference #2 is less than or equal to a preset temperature threshold #6.

If a determining result is yes (to be specific, the difference #2 is less than or equal to the preset temperature threshold #6), the controller #A may control the fan 182 to decrease the rotation speed.

As an example, instead of a limitation, the temperature threshold #6 may be determined based on a preset compensation value (denoted as C). For example, a value of the temperature threshold #6 may be −C.

As an example, instead of a limitation, a value of C may be any temperature value in 1° C. to 2° C., for example, 1° C. or 2° C.

In this application, the value of the temperature threshold #6 may include but is not limited to −1° C. or −2° C.

It should be understood that a specific temperature of the temperature threshold #6 listed above is merely an example for description, and this application is not limited thereto.

It should be noted that S154 may be performed before S156. In this case, if the determining result of determining #E is no, S156 is performed. In addition, in this case, if the determining result of determining #F is no, to be specific, the difference #2 is less than the temperature threshold #5, and the difference #2 is greater than the temperature threshold #6, a current rotation speed of the fan is maintained.

Alternatively, S156 may be performed before S154. In this case, if the determining result of determining #F is no. S154 is performed. In addition, in this case, if the determining result of determining #E is no, to be specific, the difference #2 is less than the temperature threshold #5, and the difference #2 is greater than the temperature threshold 6, a current rotation speed of the fan is maintained.

It should be noted that in this application, the controller 184 and the controller #A may be a same controller or may be different controllers. This is not limited in this application.

In the cooling mode, it is assumed that a temperature of the refrigerant #A output from the sixth interface 156 of the heat exchange plate 150 is T1, and a temperature of the refrigerant #A input to the compressor 110 (namely, a temperature detected by the first temperature sensor 120) is T2.

Under control of the depressurization apparatus 140, T2 can be in a preset range, for example, 18° C.

When the second heat exchanger 180 is not disposed, T1 is the same as T2. Consequently. T1 is excessively high and a cooling effect on the battery is affected. In addition, a case in which a temperature T3 (for example, 13.5° C.) of the refrigerant #A output from the sixth interface 156 of the heat exchange plate 150 is quite different from T1 may occur.

In contrast, the second heat exchanger 180 is disposed, because of a heating effect of the second heat exchanger 180, it is assumed that a temperature added by the second heat exchanger to the refrigerant #A output from the sixth interface 156 of the heat exchange plate 150 is T4, and T2=T1+T4. To be specific, T1 is less than 18° C. (for example, in this application, after the second heat exchanger 180 is disposed. T1 may reach 10° C.). Therefore, the cooling effect of the battery can be improved, and the difference between T3 and T1 can be reduced.

In the heating mode, it is assumed that a temperature of the refrigerant #A output from the output port 116 of the compressor 110 is T5 (for example, 61° C.).

It is assumed that a temperature input to the sixth interface 156 of the heat exchange plate 150 is T6.

When the second heat exchanger 180 is not disposed. T5 is the same as T6. Consequently, T6 is excessively high and the battery is overheated.

In contrast, the second heat exchanger 180 is disposed, because of a cooling effect of the second heat exchanger 180, it is assumed that a temperature decreased by the second heat exchanger for the refrigerant #A output from the output port 116 of the compressor 110 is T7, and T6=T5-T7. To be specific, T6 is less than 61° C. (for example, in this application, after the second heat exchanger 180 is disposed, T6 may reach 45° C.). This can protect the battery from overheating.

The following separately describes in detail loop paths, temperature changes, and the like of the refrigerant #A in the cooling mode and the heating mode.

Figure 8:
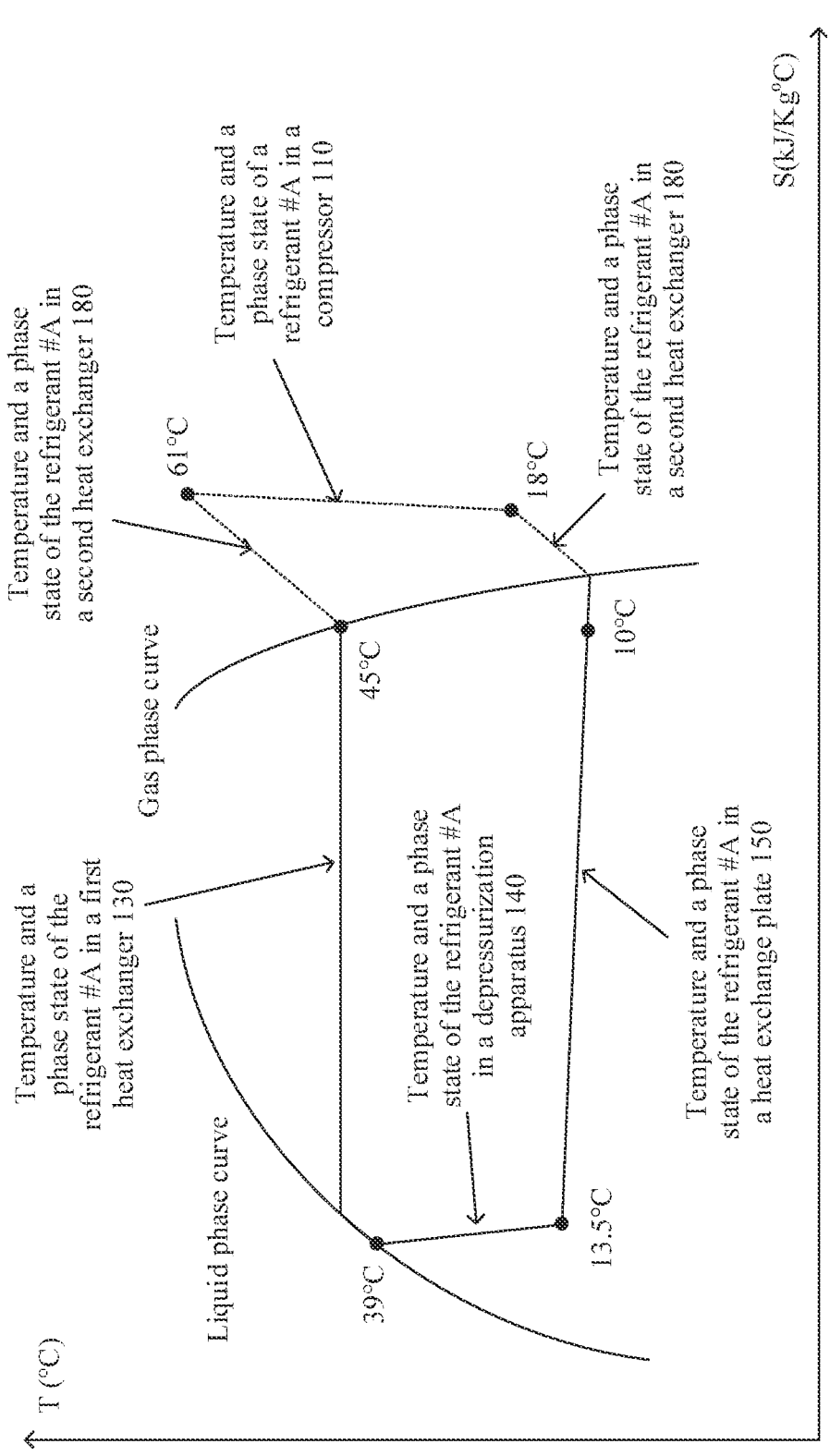
FIG. 8 is an example of a temperature entropy production diagram in a cooling mode when a second heat exchanger is implemented in Manner 1.

FIG. 8 is an example of a temperature entropy production diagram in a cooling mode when a second heat exchanger 180 is implemented in Manner 1.

First, a cycle process in the structure 1 is described. As shown in FIG. 2 and FIG. 8, first, the compressor 110 outputs a high-temperature and high-pressure gaseous refrigerant #A from the output port 116.

In the compressor 110, the refrigerant #A may be in a gas phase. In addition, as an example instead of a limitation, a temperature of the high-temperature and high-pressure gaseous refrigerant #A may be, for example, 61° C.

The output port 116 is connected to the second port 164 of the four-way valve 160 through a pipe. To be specific, the high-temperature and high-pressure gaseous refrigerant #A enters the four-way valve 160 from the second port 164 of the four-way valve 160.

In the cooling mode, the second port 164 of the four-way valve 160 is connected to the third port 166 of the four-way valve 160. To be specific, the high-temperature and high-pressure gaseous refrigerant #A is output from the third port 166 of the four-way valve 160.

The third port 166 of the four-way valve 160 is connected to the first interface 132 of the first heat exchanger 130. To be specific, the high-temperature and high-pressure gaseous refrigerant #A enters the first heat exchanger 130 from the first interface 132 of the first heat exchanger 130.

It should be noted that, when the second heat exchanger 180 is configured in Manner 1, in the structure 1, the refrigerant #A input to the first heat exchanger 130 is used as a heat release source of the second heat exchanger 180 to reduce a temperature. To be specific, a temperature of the refrigerant #A input to the first heat exchanger 130 is lower than the temperature of the high-temperature and high-pressure gaseous refrigerant #A output from the output port 116.

As an example, instead of a limitation, the temperature of the refrigerant #A input to the first heat exchanger 130 may be, for example, 45° C.

The refrigerant #A input to the first heat exchanger 130 is cooled to a supercooled liquid in the first heat exchanger 130, and then is output from the second interface 136 of the first heat exchanger 130.

As an example, instead of a limitation, a temperature of the refrigerant #A output from the first heat exchanger 130 may be, for example, 39° C.

The second interface 136 of the first heat exchanger 130 is connected to the third interface 142 of the depressurization apparatus 140. To be specific, the liquid refrigerant #A enters the depressurization apparatus 140 from the third interface 142 of the depressurization apparatus 140.

The refrigerant #A input to the depressurization apparatus 140 is throttled into a low-temperature and low-pressure gas-liquid two-phase fluid in the depressurization apparatus 140, and then is output from the fourth interface 146 of the depressurization apparatus 140.

As an example, instead of a limitation, a temperature of the refrigerant #A output from the depressurization apparatus 140 may be, for example, 13.5° C.

The fourth interface 146 of the depressurization apparatus 140 is connected to the fifth interface 152 of the heat exchange plate 150 (for example, the battery cold plate). To be specific, the low-temperature and low-pressure refrigerant #A enters the heat exchange plate 150 from the fifth interface 152 of the heat exchange plate 150.

Therefore, the low-temperature and low-pressure refrigerant #A cools the management object 151 (for example, the battery) in the heat exchange plate 150, or the low-temperature and low-pressure refrigerant #A exchanges heat with the management object 151 in the heat exchange plate 150, and then is output from the sixth port 156 of the heat exchanger board 150.

As an example, instead of a limitation, a temperature of the refrigerant #A output from the sixth interface 156 of the heat exchange plate 150 may be, for example, 10° C.

In the structure 1, the second heat exchanger 180 heats the refrigerant #A output from the sixth interface 156 of the heat exchange plate 150.

The refrigerant #A heated by the second heat exchanger 180 may be converted from a gas-liquid two-phase state to a gas state.

As an example, instead of a limitation, a temperature of the refrigerant #A heated by the second heat exchanger 180 may be, for example, 18° C.

The refrigerant #A heated by the second heat exchanger 180 is input to the first port 162 of the four-way valve 160.

In the cooling mode, the first port 162 of the four-way valve 160 is connected to the fourth port 168 of the four-way valve 160. To be specific, the refrigerant #A is output from the fourth port 168 of the four-way valve 160.

The fourth port 168 of the four-way valve 160 is connected to the input port 112 of the compressor 110, so that the low-temperature gaseous refrigerant #A returns to the compressor 110 from the input port 112 of the compressor 110, thereby completing a refrigeration cycle.

It should be noted that a temperature of the refrigerant #A at the fifth interface 152 and the temperature of the refrigerant #A at the sixth interface 156 of the heat exchange plate 150 are different. Alternatively, a reason why the temperature (for example, 10° C.) of the refrigerant #A at the sixth interface 156 is lower than a temperature (for example, 13.5° C.) of the refrigerant #A at the fifth interface 152 may be that pressure at the sixth interface 156 is lower than pressure at the fifth interface 152. Therefore, a boiling point of the refrigerant #A at the sixth interface 156 is lower than a boiling point of the refrigerant #A at the fifth interface 152.

The following describes a cycle process in the structure 2. As shown in FIG. 3 and FIG. 8, first, the compressor 110 outputs a high-temperature and high-pressure gaseous refrigerant #A from the output port 116.

In the compressor 110, the refrigerant #A may be in a gas phase. In addition, as an example instead of a limitation, a temperature of the high-temperature and high-pressure gaseous refrigerant #A may be, for example, 61° C.

The output port 116 is connected to the second port 164 of the four-way valve 160 through a pipe. To be specific, the high-temperature and high-pressure gaseous refrigerant #A enters the four-way valve 160 from the second port 164 of the four-way valve 160.

As shown in FIG. 3, the heat exchanger 180 enables the third pipe 176 to exchange beat with the fourth pipe 178.

In this case, a temperature of the refrigerant #A input to the second port 164 is lower than 61° C. For example, the temperature of the refrigerant #A input to the second port 164 may be 45° C.

In the cooling mode, the second port 164 of the four-way valve 160 is connected to the third port 166 of the four-way valve 160. To be specific, the high-temperature and high-pressure gaseous refrigerant #A is output from the third port 166 of the four-way valve 160.

The third port 166 of the four-way valve 160 is connected to the first interface 132 of the first heat exchanger 130. To be specific, the high-temperature and high-pressure gaseous refrigerant #A enters the first heat exchanger 130 from the first interface 132 of the first heat exchanger 130.

As an example, instead of a limitation, a temperature of the refrigerant #A input to the first heat exchanger 130 may be, for example, 45° C.

The refrigerant #A input to the first heat exchanger 130 is cooled to a supercooled liquid in the first heat exchanger 130, and then is output from the second interface 136 of the first heat exchanger 130.

As an example, instead of a limitation, a temperature of the refrigerant #A output from the first heat exchanger 130 may be, for example, 39° C.

The second interface 136 of the first heat exchanger 130 is connected to the third interface 142 of the depressurization apparatus 140. To be specific, the liquid refrigerant #A enters the depressurization apparatus 140 from the third interface 142 of the depressurization apparatus 140.

The refrigerant #A input to the depressurization apparatus 140 is throttled into a low-temperature and low-pressure gas-liquid two-phase fluid in the depressurization apparatus 140, and then is output from the fourth interface 146 of the depressurization apparatus 140.

As an example, instead of a limitation, a temperature of the refrigerant #A output from the depressurization apparatus 140 may be, for example, 13.5° C.

The fourth interface 146 of the depressurization apparatus 140 is connected to the fifth interface 152 of the heat exchange plate 150 (for example, the battery cold plate). To be specific, the low-temperature and low-pressure refrigerant #A enters the heat exchange plate 150 from the fifth interface 152 of the heat exchange plate 150.

Therefore, the low-temperature and low-pressure refrigerant #A cools the management object 151 (for example, the battery) in the heat exchange plate 150, or the low-temperature and low-pressure refrigerant #A exchanges heat with the management object 151 in the heat exchange plate 150, and then is output from the sixth port 156 of the heat exchanger board 150.

As an example, instead of a limitation, a temperature of the refrigerant #A output from the sixth interface 156 of the heat exchange plate 150 may be, for example, 10° C.

In the structure 2, the sixth interface 156 is connected to the first port 162 of the four-way valve 160. To be specific, the refrigerant #A is input to the first port 162 of the four-way valve 160.

In the cooling mode, the first port 162 of the four-way valve 160 is connected to the fourth port 168 of the four-way valve 160. To be specific, the refrigerant #A is output from the fourth port 168 of the four-way valve 160.

The fourth port 168 of the four-way valve 160 is connected to the input port 112 of the compressor 110, so that the low-temperature gaseous refrigerant #A returns to the compressor 110 from the input port 112 of the compressor 110, thereby completing a refrigeration cycle.

It should be noted that, when the second heat exchanger 180 is configured in Manner 1, in the structure 2, the refrigerant #A output from the fourth port 168 is heated in the second heat exchanger 180 by the refrigerant #A output from the output port 116 to heat up. To be specific, a temperature of the refrigerant #A input to the input port 112 of the compressor 110 is higher than a temperature of the refrigerant #A output from the fourth port 168 of the four-way valve 160.

In the structure 1, the second heat exchanger 180 heats the refrigerant #A output from the sixth interface 156 of the heat exchange plate 150.

The refrigerant #A heated by the second heat exchanger 180 may be converted from a gas-liquid two-phase state to a gas state.

As an example, instead of a limitation, a temperature of the refrigerant #A heated by the second heat exchanger 180 may be, for example, 18° C.

It should be noted that a temperature of the refrigerant #A at the fifth interface 152 and the temperature of the refrigerant #A at the sixth interface 156 of the heat exchange plate 150 are different. Alternatively, a reason why the temperature (for example, 10° C.) of the refrigerant #A at the sixth interface 156 is lower than a temperature (for example, 13.5° C.) of the refrigerant #A at the fifth interface 152 may be that pressure at the sixth interface 156 is lower than pressure at the fifth interface 152. Therefore, a boiling point of the refrigerant #A at the sixth interface 156 is lower than a boiling point of the refrigerant #A at the fifth interface 152.

Figure 9:
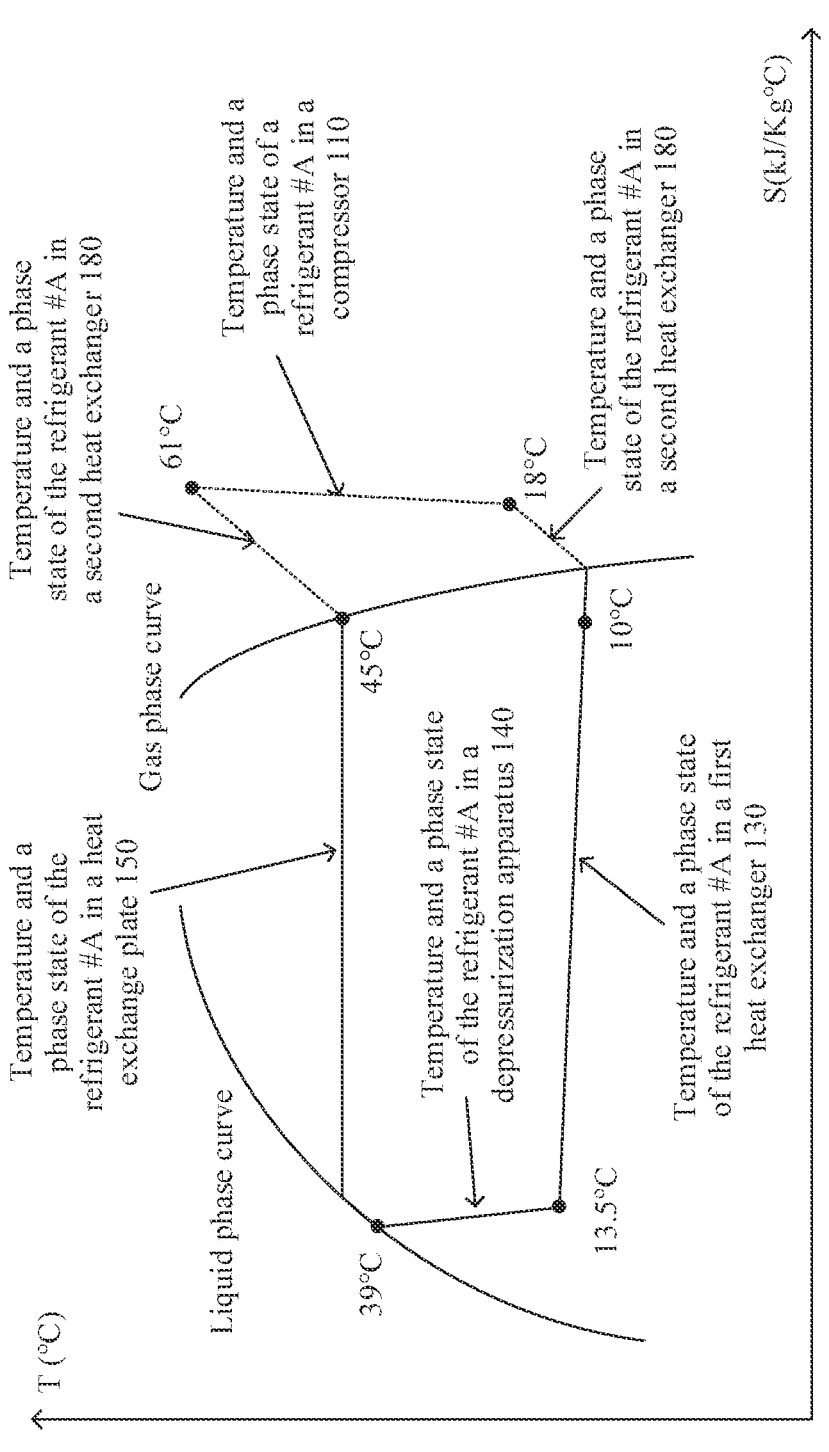
FIG. 9 is an example of a temperature entropy production diagram in a cooling mode when a second heat exchanger is implemented in Manner 2.

FIG. 9 is an example of a temperature entropy production diagram in a heating mode when a second heat exchanger 180 is implemented in Manner 2.

First, a cycle process in the structure 1 is described. As shown in FIG. 2 and FIG. 9, first, the compressor 110 outputs a high-temperature and high-pressure gaseous refrigerant #A from the output port 116.

In the compressor 110, the refrigerant #A may be in a gas phase. In addition, as an example instead of a limitation, a temperature of the high-temperature and high-pressure gaseous refrigerant #A may be, for example, 61° C.

The output port 116 is connected to the second port 164 of the four-way valve 160 through a pipe. To be specific, the high-temperature and high-pressure gaseous refrigerant #A enters the four-way valve 160 from the second port 164 of the four-way valve 160.

In the heating mode, the second port 164 of the four-way valve 160 is connected to the first port 162 of the four-way valve 160. To be specific, the high-temperature and high-pressure gaseous refrigerant #A is output from the first port 162 of the four-way valve 160.

Then, the second heat exchanger 180 cools the refrigerant #A output from the first port 162 of the four-way valve 160.

As an example, instead of a limitation, the refrigerant #A cooled by the second heat exchanger 180 may be a gas-liquid two-phase refrigerant, and a temperature of the refrigerant #A may be, for example, 45° C.

Then, the refrigerant #A cooled by the second heat exchanger 180 is input to the sixth interface 156 of the heat exchange plate 150.

Therefore, the high-temperature and high-pressure refrigerant #A heats the management object 151 (for example, the battery) in the heat exchange plate 150, or the high-temperature and high-pressure refrigerant #A exchanges heat with the management object 151 in the heat exchange plate 150, and then is output from the fifth port 152 of the heat exchange plate 150.

As an example, instead of a limitation, the refrigerant #A output from the fifth interface 152 of the heat exchange plate 150 may be in a liquid state, and a temperature of the refrigerant #A may be, for example, 39° C.

The fifth interface 152 of the heat exchange plate 150 (for example, the battery cold plate) is connected to the fourth interface 146 of the depressurization apparatus 140. To be specific, the high-temperature liquid refrigerant #A enters the depressurization apparatus 140 from the fourth interface 146 of the depressurization apparatus 140.

The refrigerant #A input to the depressurization apparatus 140 is throttled into a low-temperature and low-pressure gas-liquid two-phase fluid in the depressurization apparatus 140, and then is output from the third interface 142 of the depressurization apparatus 140.

As an example, instead of a limitation, a temperature of the refrigerant #A output from the depressurization apparatus 140 may be, for example, 13.5° C.

The third interface 142 of the depressurization apparatus 140 is connected to the second interface 136 of the first heat exchanger 130. To be specific, the liquid refrigerant #A enters the first heat exchanger 130 from the second interface 136 of the first heat exchanger 130.

The refrigerant #A input to the first heat exchanger 130 exchanges heat (for example, absorbs heat and evaporates) in the first heat exchanger 130, and then is output from the first interface 132 of the first heat exchanger 130.

As an example, instead of a limitation, the refrigerant #A output from the first heat exchanger 130 may be a gas-liquid two-phase refrigerant, and a temperature of the refrigerant #A may be, for example, 10° C.

The first interface 132 of the first heat exchanger 130 is connected to the third port 166 of the four-way valve 160. To be specific, the low-temperature and low-pressure gaseous refrigerant #A enters the four-way valve 160 from the third port 166 of the four-way valve 160.

It should be noted that, when the second heat exchanger 180 is configured in Manner 2, the refrigerant #A input to the four-way valve 160 is used as a heat absorption source of the second heat exchanger 180 to increase a temperature. To be specific, a temperature of the refrigerant #A input to the four-way valve 160 is higher than the temperature of the refrigerant #A output from the first heat exchanger 130.

As an example, instead of a limitation, the temperature of the refrigerant #A input to the four-way valve 160 may be, for example, 18° C.

In the heating mode, the third port 166 of the four-way valve 160 is connected to the fourth port 168 of the four-way valve 160. To be specific, the refrigerant #A is output from the fourth port 168 of the four-way valve 160.

The fourth port 168 of the four-way valve 160 is connected to the input port 112 of the compressor 110, so that the low-temperature gaseous refrigerant #A returns to the compressor 110 from the input port 112 of the compressor 110, thereby completing a heating cycle.

It should be noted that the temperature of the refrigerant #A at the first interface 132 and a temperature of the refrigerant #A at the second interface 136 of the first heat exchanger 130 are different. Alternatively, a reason why the temperature (for example, 10° C.) of the refrigerant #A at the second interface 132 is lower than a temperature (for example, 13.5° C.) of the refrigerant #A at the second interface 136 may be that pressure at the first interface 132 is lower than pressure at the second interface 136. Therefore, a boiling point of the refrigerant #A at the first interface 132 is lower than a boiling point of the refrigerant #A at the second interface 136.

In addition, different from the structure 1, in the structure 2, the heat exchanger 180 enables the third pipe 176 to exchange heat with the fourth pipe 178.

In this case, a temperature of the refrigerant #A input to the second port 164 is lower than 61° C. For example, the temperature of the refrigerant #A input to the second port 164 may be 45° C.

In addition, in this case, a temperature of the refrigerant #A input to the third port 166 is lower than 18° C. For example, the temperature of the refrigerant #A input to the third port 166 may be 10° C.

The following describes a cycle process in the structure 2. As shown in FIG. 3 and FIG. 9, first, the compressor 110 outputs a high-temperature and high-pressure gaseous refrigerant #A from the output port 116.

In the compressor 110, the refrigerant #A may be in a gas phase. In addition, as an example instead of a limitation, a temperature of the high-temperature and high-pressure gaseous refrigerant #A may be, for example, 61° C.

The output port 116 is connected to the second port 164 of the four-way valve 160 through a pipe. To be specific, the high-temperature and high-pressure gaseous refrigerant #A enters the four-way valve 160 from the second port 164 of the four-way valve 160.

As shown in FIG. 3, the heat exchanger 180 enables the third pipe 176 to exchange heat with the fourth pipe 178.

In this case, a temperature of the refrigerant #A input to the second port 164 is lower than 61° C. For example, the temperature of the refrigerant #A input to the second port 164 may be 45° C.

In the heating mode, the second port 164 of the four-way valve 160 is connected to the first port 162 of the four-way valve 160. To be specific, the high-temperature and high-pressure gaseous refrigerant #A is output from the first port 162 of the four-way valve 160.

As shown in FIG. 3, the first port 162 of the four-way valve 160 is connected to the sixth interface 156 of the heat exchange plate 150. To be specific, the refrigerant #A output from the first port 162 is input to the sixth interface 156 of the heat exchange plate 150.

Therefore, the high-temperature and high-pressure refrigerant #A heats the management object 151 (for example, the battery) in the heat exchange plate 150, or the high-temperature and high-pressure refrigerant #A exchanges heat with the management object 151 in the heat exchange plate 150, and then is output from the fifth port 152 of the heat exchange plate 150.

As an example, instead of a limitation, the refrigerant #A output from the fifth interface 152 of the heat exchange plate 150 may be in a liquid state, and a temperature of the refrigerant #A may be, for example, 39° C.

The fifth interface 152 of the heat exchange plate 150 (for example, the battery cold plate) is connected to the fourth interface 146 of the depressurization apparatus 140. To be specific, the high-temperature liquid refrigerant #A enters the depressurization apparatus 140 from the fourth interface 146 of the depressurization apparatus 140.

The refrigerant #A input to the depressurization apparatus 140 is throttled into a low-temperature and low-pressure gas-liquid two-phase fluid in the depressurization apparatus 140, and then is output from the third interface 142 of the depressurization apparatus 140.

As an example, instead of a limitation, a temperature of the refrigerant #A output from the depressurization apparatus 140 may be, for example, 13.5° C.

The third interface 142 of the depressurization apparatus 140 is connected to the second interface 136 of the first heat exchanger 130. To be specific, the liquid refrigerant #A enters the first heat exchanger 130 from the second interface 136 of the first heat exchanger 130.

The refrigerant #A input to the first heat exchanger 130 exchanges heat (for example, absorbs heat and evaporates) in the first heat exchanger 130, and then is output from the first interface 132 of the first heat exchanger 130.

As an example, instead of a limitation, the refrigerant #A output from the first heat exchanger 130 may be a gas-liquid two-phase refrigerant, and a temperature of the refrigerant #A may be, for example, 10° C.

The first interface 132 of the first heat exchanger 130 is connected to the third port 166 of the four-way valve 160. To be specific, the low-temperature and low-pressure gaseous refrigerant #A enters the four-way valve 160 from the third port 166 of the four-way valve 160.

In the heating mode, the third port 166 of the four-way valve 160 is connected to the fourth port 168 of the four-way valve 160. To be specific, the refrigerant #A is output from the fourth port 168 of the four-way valve 160.

The fourth port 168 of the four-way valve 160 is connected to the input port 112 of the compressor 110, so that the low-temperature gaseous refrigerant #A returns to the compressor 110 from the input port 112 of the compressor 110, thereby completing a heating cycle.

It should be noted that, when the second heat exchanger 180 is configured in Manner 2, the refrigerant #A output from the fourth port 168 of the four-way valve 160 is used as a heat absorption source of the second heat exchanger 180 to increase a temperature. To be specific, a temperature of the refrigerant #A input to the input port 112 of the compressor 110 is higher than a temperature of the refrigerant #A output from the fourth port 168 of the four-way valve 160.

As an example, instead of a limitation, the temperature of the refrigerant #A the input port 112 of the compressor 110 may be, for example, 18° C.

It should be noted that the temperature of the refrigerant #A at the first interface 132 and a temperature of the refrigerant #A at the second interface 136 of the first heat exchanger 130 are different. Alternatively, a reason why the temperature (for example, 10° C.) of the refrigerant #A at the second interface 132 is lower than a temperature (for example, 13.5° C.) of the refrigerant #A at the second interface 136 may be that pressure at the first interface 132 is lower than pressure at the second interface 136. Therefore, a boiling point of the refrigerant #A at the first interface 132 is lower than a boiling point of the refrigerant #A at the second interface 136.

Figure 10:
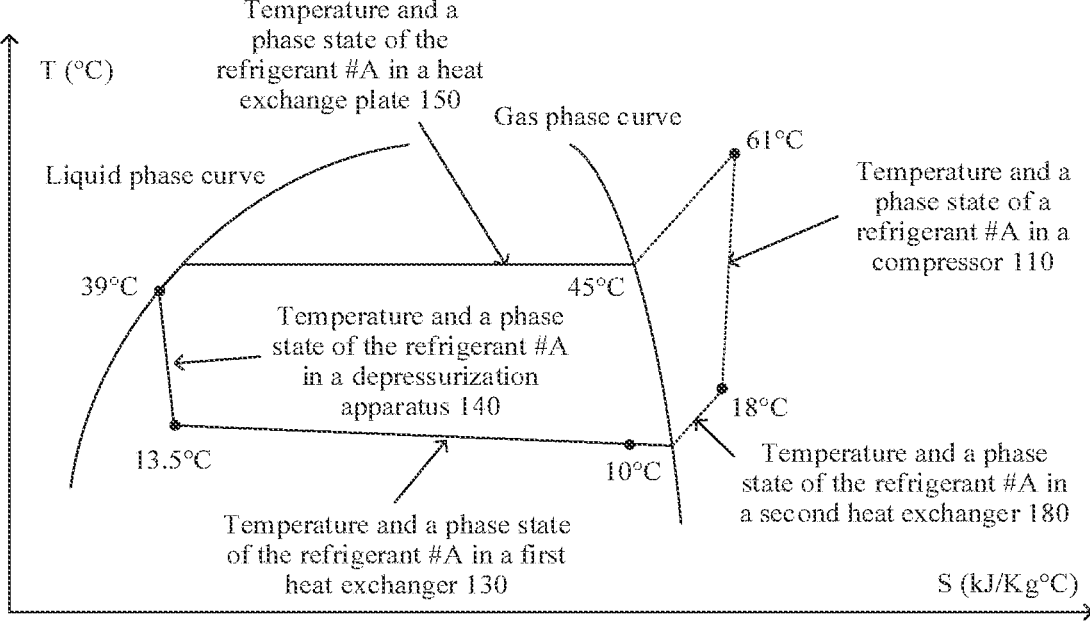
FIG. 10 is an example of a temperature entropy production diagram in a heating mode when a second heat exchanger is implemented in Manner 1.

FIG. 10 is an example of a temperature entropy production diagram in a cooling mode when a second heat exchanger 180 is implemented in Manner 2.

As shown in FIG. 4 and FIG. 10, first, the compressor 110 outputs a high-temperature and high-pressure gaseous refrigerant #A from the output port 116.

In the compressor 110, the refrigerant #A may be in a gas phase. In addition, as an example instead of a limitation, a temperature of the high-temperature and high-pressure gaseous refrigerant #A may be, for example, 61° C.

The output port 116 is connected to the second port 164 of the four-way valve 160 through a pipe. To be specific, the high-temperature and high-pressure gaseous refrigerant #A enters the four-way valve 160 from the second port 164 of the four-way valve 160.

In the cooling mode, the second port 164 of the four-way valve 160 is connected to the third port 166 of the four-way valve 160. To be specific, the high-temperature and high-pressure gaseous refrigerant #A is output from the third port 166 of the four-way valve 160.

The third port 166 of the four-way valve 160 is connected to the first interface 132 of the first heat exchanger 130. To be specific, the high-temperature and high-pressure gaseous refrigerant #A enters the first heat exchanger 130 from the first interface 132 of the first heat exchanger 130.

In this case, a temperature of the refrigerant #A input to the first heat exchanger 130 may be, for example, 61° C.

The refrigerant #A input to the first heat exchanger 130 is cooled to a supercooled liquid in the first heat exchanger 130, and then is output from the second interface 136 of the first heat exchanger 130.

As an example, instead of a limitation, a temperature of the refrigerant #A output from the first heat exchanger 130 may be, for example, 39° C.

The second interface 136 of the first heat exchanger 130 is connected to the third interface 142 of the depressurization apparatus 140. To be specific, the liquid refrigerant #A enters the depressurization apparatus 140 from the third interface 142 of the depressurization apparatus 140.

The refrigerant #A input to the depressurization apparatus 140 is throttled into a low-temperature and low-pressure gas-liquid two-phase fluid in the depressurization apparatus 140, and then is output from the fourth interface 146 of the depressurization apparatus 140.

As an example, instead of a limitation, a temperature of the refrigerant #A output from the depressurization apparatus 140 may be, for example, 13.5° C.

The fourth interface 146 of the depressurization apparatus 140 is connected to the fifth interface 152 of the heat exchange plate 150 (for example, the battery cold plate). To be specific, the low-temperature and low-pressure refrigerant #A enters the heat exchange plate 150 from the fifth interface 152 of the heat exchange plate 150.

Therefore, the low-temperature and low-pressure refrigerant #A cools the management object 151 (for example, the battery) in the heat exchange plate 150, or the low-temperature and low-pressure refrigerant #A exchanges heat with the management object 151 in the heat exchange plate 150, and then is output from the sixth port 156 of the heat exchanger board 150.

As an example, instead of a limitation, a temperature of the refrigerant #A output from the sixth interface 156 of the heat exchange plate 150 may be, for example, 10° C.

The second heat exchanger 180 heats the refrigerant #A output from the sixth interface 156 of the heat exchange plate 150.

The refrigerant #A heated by the second heat exchanger 180 may be converted from a gas-liquid two-phase state to a gas state.

As an example, instead of a limitation, a temperature of the refrigerant #A heated by the second heat exchanger 180 may be, for example, 18° C.

The refrigerant #A heated by the second heat exchanger 180 is input to the first port 162 of the four-way valve 160.

In the cooling mode, the first port 162 of the four-way valve 160 is connected to the fourth port 168 of the four-way valve 160. To be specific, the refrigerant #A is output from the fourth port 168 of the four-way valve 160.

The fourth port 168 of the four-way valve 160 is connected to the input port 112 of the compressor 110, so that the low-temperature gaseous refrigerant #A returns to the compressor 110 from the input port 112 of the compressor 110, thereby completing a refrigeration cycle.

It should be noted that a temperature of the refrigerant #A at the fifth interface 152 and the temperature of the refrigerant #A at the sixth interface 156 of the heat exchange plate 150 are different. Alternatively, a reason why the temperature (for example, 10° C.) of the refrigerant #A at the sixth interface 156 is lower than a temperature (for example, 13.5° C.) of the refrigerant #A at the fifth interface 152 may be that pressure at the sixth interface 156 is lower than pressure at the fifth interface 152. Therefore, a boiling point of the refrigerant #A at the sixth interface 156 is lower than a boiling point of the refrigerant #A at the fifth interface 152.

Figure 11:
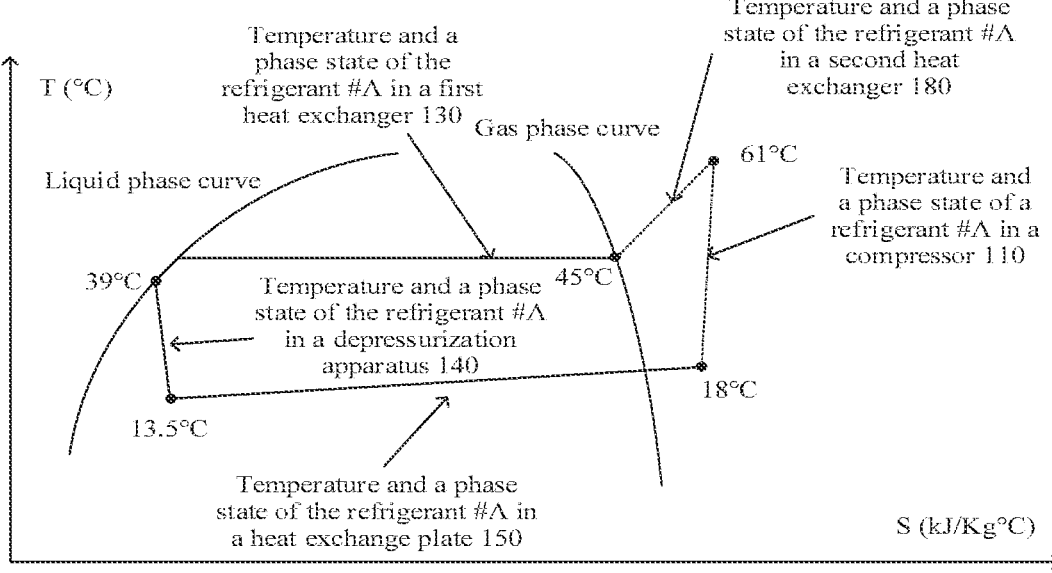
FIG. 11 is an example of a temperature entropy production diagram in a heating mode when a second heat exchanger is implemented in Manner 2.

FIG. 11 is an example of a temperature entropy production diagram in a heating mode when a second heat exchanger 180 is implemented in Manner 2.

As shown in FIG. 4 and FIG. 11, first, the compressor 110 outputs a high-temperature and high-pressure gaseous refrigerant #A from the output port 116.

In the compressor 110, the refrigerant #A may be in a gas phase. In addition, as an example instead of a limitation, a temperature of the high-temperature and high-pressure gaseous refrigerant #A may be, for example, 61° C.

The output port 116 is connected to the second port 164 of the four-way valve 160 through a pipe. To be specific, the high-temperature and high-pressure gaseous refrigerant #A enters the four-way valve 160 from the second port 164 of the four-way valve 160.

In the heating mode, the second port 164 of the four-way valve 160 is connected to the first port 162 of the four-way valve 160. To be specific, the high-temperature and high-pressure gaseous refrigerant #A is output from the first port 162 of the four-way valve 160.

Then, the second heat exchanger 180 cools the refrigerant #A output from the first port 162 of the four-way valve 160.

As an example, instead of a limitation, the refrigerant #A cooled by the second heat exchanger 180 may be a gas-liquid two-phase refrigerant, and a temperature of the refrigerant #A may be, for example, 45° C.

Then, the refrigerant #A cooled by the second heat exchanger 180 is input to the sixth interface 156 of the heat exchange plate 150.

Therefore, the high-temperature and high-pressure refrigerant #A heats the management object 151 (for example, the battery) in the heat exchange plate 150, or the high-temperature and high-pressure refrigerant #A exchanges heat with the management object 151 in the heat exchange plate 150, and then is output from the fifth port 152 of the heat exchange plate 150.

As an example, instead of a limitation, the refrigerant #A output from the fifth interface 152 of the heat exchange plate 150 may be in a liquid state, and a temperature of the refrigerant #A may be, for example, 39° C.

The fifth interface 152 of the heat exchange plate 150 (for example, the battery cold plate) is connected to the fourth interface 146 of the depressurization apparatus 140. To be specific, the high-temperature liquid refrigerant #A enters the depressurization apparatus 140 from the fourth interface 146 of the depressurization apparatus 140.

The refrigerant #A input to the depressurization apparatus 140 is throttled into a low-temperature and low-pressure gas-liquid two-phase fluid in the depressurization apparatus 140, and then is output from the third interface 142 of the depressurization apparatus 140.

As an example, instead of a limitation, a temperature of the refrigerant #A output from the depressurization apparatus 140 may be, for example, 13.5° C.

The third interface 142 of the depressurization apparatus 140 is connected to the second interface 136 of the first heat exchanger 130. To be specific, the liquid refrigerant #A enters the first heat exchanger 130 from the second interface 136 of the first heat exchanger 130.

The refrigerant #A input to the first heat exchanger 130 exchanges heat (for example, absorbs heat and evaporates) in the first heat exchanger 130, and then is output from the first interface 132 of the first heat exchanger 130.

As an example, instead of a limitation, the refrigerant #A output from the first heat exchanger 130 may be a gas-liquid two-phase refrigerant, and a temperature of the refrigerant #A may be, for example, 18□.

The first interface 132 of the first heat exchanger 130 is connected to the third port 166 of the four-way valve 160. To be specific, the low-temperature and low-pressure gaseous refrigerant #A enters the four-way valve 160 from the third port 166 of the four-way valve 160.

In the heating mode, the third port 166 of the four-way valve 160 is connected to the fourth port 168 of the four-way valve 160. To be specific, the refrigerant #A is output from the fourth port 168 of the four-way valve 160.

The fourth port 168 of the four-way valve 160 is connected to the input port 112 of the compressor 110, so that the low-temperature gaseous refrigerant #A returns to the compressor 110 from the input port 112 of the compressor 110, thereby completing a heating cycle.

As an example, instead of a limitation, the management object (or a cooled or heated object) in this application may be a battery.

In addition, as an example instead of a limitation, the battery may be a vehicle battery.

Figure 12:
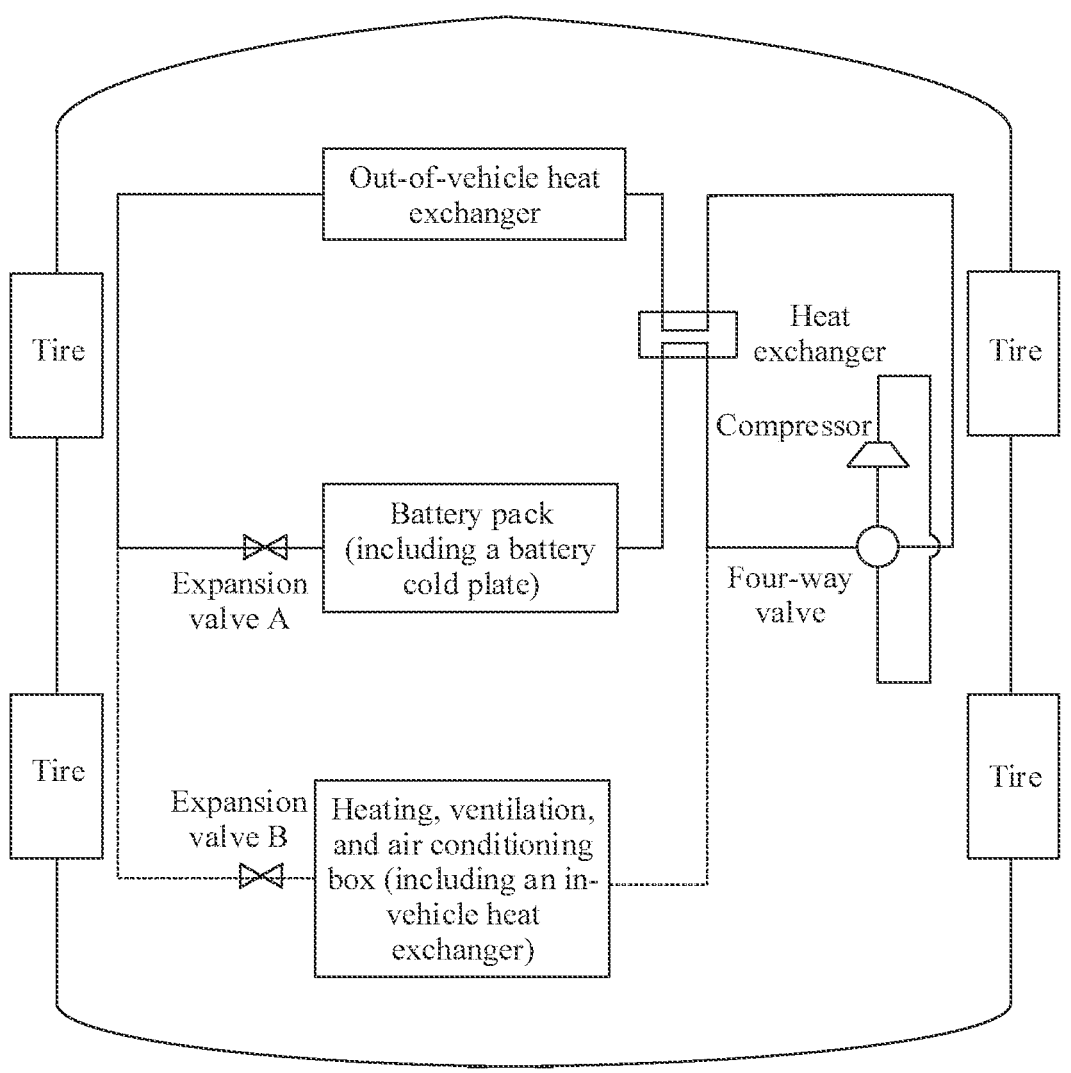
FIG. 12 is a schematic diagram of an example of a manner of configuring a vehicle temperature management system in a vehicle according to this application.
Figure 13:
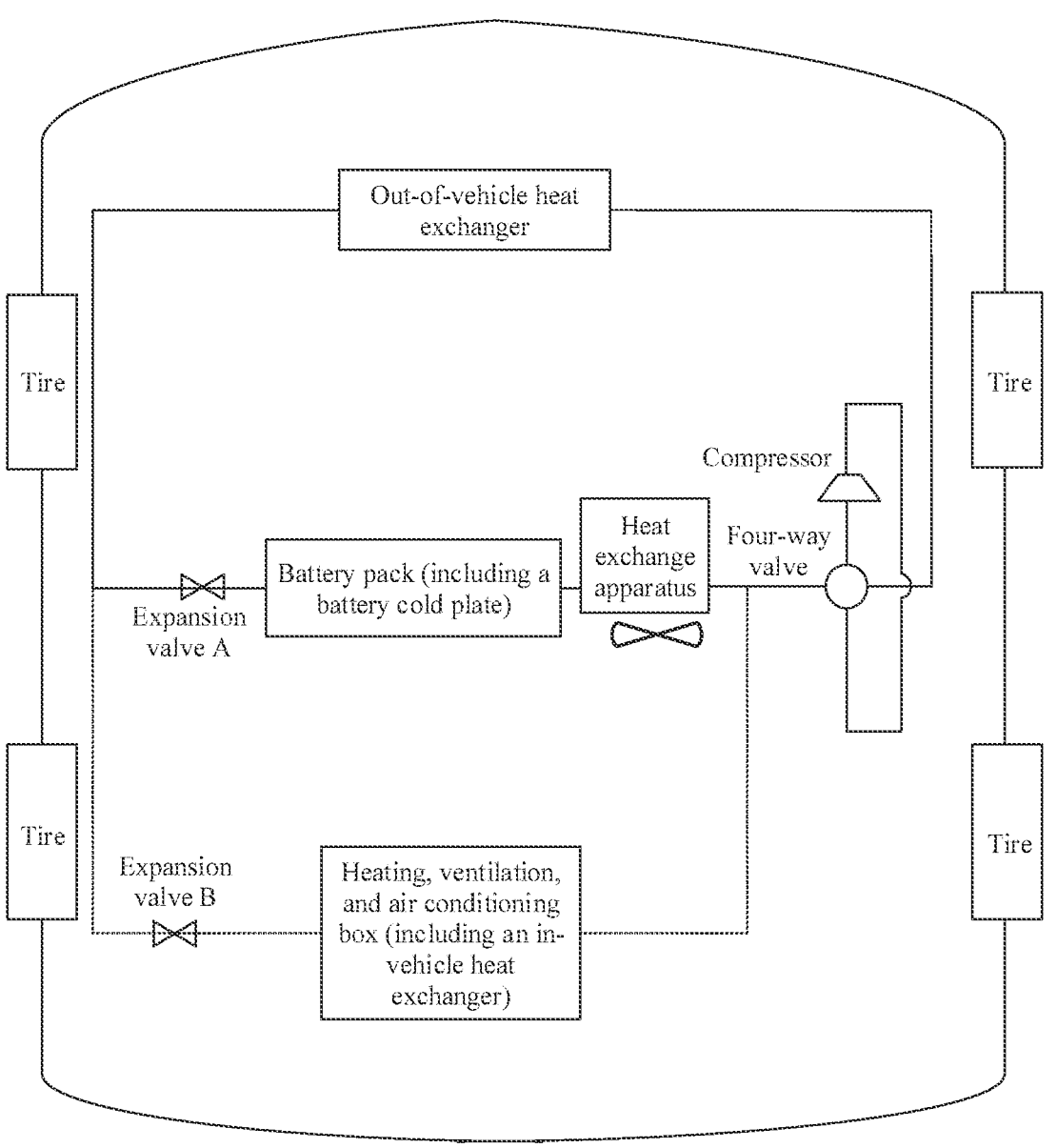
FIG. 13 is a schematic diagram of another example of a manner of configuring a vehicle temperature management system in a vehicle according to this application.

To be specific, the vehicle temperature management system in this application may be configured in a vehicle. FIG. 12 and FIG. 13 show manners of configuring a vehicle temperature management system in a vehicle according to this application.

As shown in FIG. 12 and FIG. 13, in this case, a temperature relationship system may further include a branch used to implement an in-vehicle air conditioner. In this case, one end of a heating, ventilation, and air conditioning box may be connected to an expansion valve, and the other end may be connected to a four-way valve.

According to the vehicle temperature management system provided in this application, when the management object needs to be cooled through the heat exchange plate 150, the refrigerant that flows from the heat exchange plate 150 to the compressor 110 through the four-way valve 160 can be heated through the second heat exchanger 180. To be specific, if a temperature of the refrigerant that flows out of the heat exchange plate 150 is set to t1, and a temperature of the refrigerant (namely, the refrigerant input to the compressor 110) heated by the second heat exchanger 180 is set to t2, it may be determined that t2>t1. t2 is detected using the first temperature sensor 120, and the depressurization apparatus 140 is controlled based on t2, so that t2 falls within a temperature range. This can ensure that t1 is lower than a refrigerant temperature at an inlet of the compressor 110, and further reduce a temperature difference between the input port and the output port of a cooling plate. When the management object needs to be heated through the heat exchange plate 150, the refrigerant that flows from an outlet of the compressor 110 to the heat exchange plate 150 through the four-way valve 160 can be cooled through the second heat exchanger 180. To be specific, if a temperature of the refrigerant that flows out of the compressor 110 is set to t3, and a temperature of the refrigerant (namely, the refrigerant input to the heat exchange plate 150) cooled by the second heat exchanger 180 is set to t4, it may be determined that t3>t4. This further avoids an excessively high refrigerant temperature at an inlet of the heat exchange plate 150, and can further reduce the temperature difference between the input port and the output port of the cooling plate. Therefore, according to the vehicle temperature management system in this application, evenness of temperature distribution of the heat exchange plate can be improved.

It should be understood that the vehicle temperature management system in this application may also be applied to another device or place. For example, a temperature management system with a same structure may be applied to various devices, environments, or places such as a ship and a factory.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A vehicle temperature management system comprising:

a compressor comprising:

an input port; and an output port, wherein the compressor is configured to:

compress a first refrigerant, wherein the first refrigerant is input from the input port; and output the compressed first refrigerant from the output port;

a first temperature sensor coupled to the compressor and configured to detect a first temperature of the first refrigerant from the input port to the compressor;

a first heat exchanger comprising a first interface and a second interface for ingress and egress of the first refrigerant, wherein the first heat exchanger is configured to cool the first refrigerant input to the first heat exchanger;

a depressurization apparatus coupled to the first heat exchanger and the first temperature sensor and comprising a third interface and a fourth interface for ingress and egress of the first refrigerant, wherein the third interface is coupled to the second interface, and wherein the depressurization apparatus is configured to depressurize, based on the first temperature, the first refrigerant in the depressurization apparatus;

a heat exchange plate coupled to the depressurization apparatus and comprising:

a plurality of flow channels; and a fifth interface and a sixth interface for ingress and egress of the first refrigerant, wherein the fifth interface is coupled to the fourth interface, wherein the heat exchange plate is coupled to a surface of a battery of the vehicle temperature management system, and wherein the heat exchange plate is configured to exchange heat between the first refrigerant and the battery;

a second heat exchanger comprising:

a seventh interface and an eighth interface for ingress and egress of the first refrigerant, wherein the eighth interface is coupled to the first interface;

a ninth interface and a tenth interface for ingress and egress of the first refrigerant, wherein the ninth interface is coupled to the sixth interface;

a first portion of a first pipe; and a second portion of a second pipe, wherein a distance between the first portion and the second portion is less than or equal to a first threshold;

a four-way valve coupled to the compressor and the second heat exchanger, wherein the four-way valve comprises:

a first port coupled to the tenth interface;

a second port coupled to the output port;

a third port directly coupled to the seventh interface; and a fourth port coupled to the input port, wherein the first port is further coupled to the sixth interface through the first pipe, wherein the third port is further coupled to the first interface through the second pipe, wherein a first thermal conductivity of a first material of the first portion is higher than a second thermal conductivity of a portion of the first pipe other than the first portion, wherein a third thermal conductivity of a second material of the second portion is higher than a fourth thermal conductivity of a portion of the second pipe other than the second portion, wherein, in a cooling mode, the first port is further coupled to the fourth port and the second port is further coupled to the third port for cooling the battery through the heat exchange plate, wherein, in a heating mode, the first port is further coupled to the second port and the fourth port is further coupled to the third port for heating the battery through the heat exchange plate, and wherein the second heat exchanger is configured to:

heat the first refrigerant that flows from the sixth interface to the input port in the cooling mode; and cool the first refrigerant that flows from the output port to the sixth interface in the heating mode.

2. The vehicle temperature management system of claim 1, wherein the second heat exchanger is a counter-flow heat exchanger.

3. A cooling system comprising:

a first heat exchanger;

a first pipe;

a compressor comprising a compressor output and configured to:

receive a first refrigerant; and compress and output the first refrigerant;

a first temperature sensor coupled to the compressor and configured to detect a first temperature of the first refrigerant that is input to the compressor;

a second heat exchanger directly coupled to the compressor through a second pipe and configured to receive and cool the first refrigerant from the compressor, wherein the second heat exchanger comprises:

a first portion of the first pipe, wherein a first thermal conductivity of a first material of the first portion is higher than a second thermal conductivity of a portion of the first pipe other than the first portion; and a second portion of the second pipe, wherein a third thermal conductivity of a second material of the second portion is higher than a fourth thermal conductivity of a portion of the second pipe other than the second portion, wherein a distance between the first portion and the second portion is less than or equal to a first threshold, wherein the first heat exchanger is coupled to the second heat exchanger and configured to receive the first refrigerant from the second heat exchanger;

a depressurization apparatus coupled to the first temperature sensor and the first heat exchanger and configured to:

obtain the first temperature from the first temperature sensor; and depressurize, based on the first temperature, the first refrigerant from the first heat exchanger until the first temperature falls within a first temperature range;

a cooling plate comprising a plurality of flow channels, wherein the cooling plate is coupled to the depressurization apparatus, coupled to the second heat exchanger through the first pipe, and coupled to a surface of a battery of the cooling system, wherein the cooling plate is configured to enable the first refrigerant from the depressurization apparatus to exchange heat with the battery, and wherein the second heat exchanger is configured to:

enable a first portion of the first pipe to exchange heat with a second portion of the second pipe;

heat the first refrigerant from the cooling plate; and output the first refrigerant to the compressor.

4. The cooling system of claim 3, wherein the second heat exchanger comprises a heat release source comprising the first refrigerant from the compressor.

5. The cooling system of claim 3, wherein the second heat exchanger is further configured to enable the first refrigerant from the compressor to exchange heat with the first refrigerant output from the cooling plate.

6. The cooling system of claim 3, wherein the second heat exchanger is a counter-flow heat exchanger.

* * * * *